(12) United States Patent
Replete et al.

(10) Patent No.: US 9,341,243 B2
(45) Date of Patent: May 17, 2016

(54) TENSIONER AND ENDLESS DRIVE ARRANGEMENT

(71) Applicant: LITENS AUTOMOTIVE PARTNERSHIP, Woodbridge (CA)

(72) Inventors: Boris Replete, Toronto (CA); Ron Farewell, Mississauga (CA); Andrew M. Boyes, Aurora (CA); Ingo Walter, Grundau (DE); Joern Adam, Gelnhausen (DE)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 0 days.

(21) Appl. No.: 14/388,214

(22) PCT Filed: Nov. 9, 2012

(86) PCT No.: PCT/CA2012/001033
§ 371 (c)(1),
(2) Date: Sep. 25, 2014

(87) PCT Pub. No.: WO2013/142951
PCT Pub. Date: Oct. 3, 2013

(65) Prior Publication Data
US 2015/0051033 A1    Feb. 19, 2015

Related U.S. Application Data

(63) Continuation of application No. 13/434,787, filed on Mar. 29, 2012.

(60) Provisional application No. 61/645,052, filed on May 10, 2012, provisional application No. 61/655,474, filed on Jun. 4, 2012, provisional application No. 61/699,694, filed on Sep. 11, 2012.

(51) Int. Cl.
*F16H 7/12* (2006.01)
*F02B 67/06* (2006.01)
*F16H 7/08* (2006.01)

(52) U.S. Cl.
CPC ............ *F16H 7/1209* (2013.01); *F16H 7/08* (2013.01); *F16H 7/0829* (2013.01);
(Continued)

(58) Field of Classification Search
CPC .......... F16H 2007/0874; F16H 7/1281; F16H 2007/0806; F16H 2007/081; F16H 2007/0846
USPC ........................................................ 474/134
See application file for complete search history.

(56) References Cited

U.S. PATENT DOCUMENTS 4,473,362 A    9/1984   Thomey et al.
4,504,254 A    3/1985   Foster
(Continued)

FOREIGN PATENT DOCUMENTS

DE    4025936 A1    12/1992
DE    4243451 A1     6/1994
(Continued)

OTHER PUBLICATIONS

The Belt-Driven Starter Generator as Current Challenge for a Function-Optimized Belt Drive System Development, 2003, M. Bonkowski VDI, M. Bogner VDI.
(Continued)

*Primary Examiner* — Henry Liu
(74) *Attorney, Agent, or Firm* — Millman IP Inc.

(57) ABSTRACT

In one aspect, a tensioner is provided, comprising, a first tensioner arm and a second tensioner arm, a first wheel and a second wheel. The first tensioner arm is pivotable about a first pivot axis. The second tensioner arm is pivotally connected to the first arm so as to be pivotable about a second pivot axis located at a selected distance from the first pivot axis. The first wheel is rotationally connected to the first tensioner arm about a first rotation axis. The second wheel is rotationally connected to the second tensioner arm about a second rotation axis. The first and second wheels are configured to engage an endless drive member. The first and second wheels are biased in respective first and second free arm directions.

20 Claims, 23 Drawing Sheets

(52) U.S. Cl.
CPC .............. *F16H 7/1218* (2013.01); *F02B 67/06* (2013.01); *F16H 2007/081* (2013.01); *F16H 2007/0874* (2013.01); *F16H 2007/0893* (2013.01)

(56) References Cited

U.S. PATENT DOCUMENTS

| | | | |
|---|---|---|---|
| 4,698,049 A | 10/1987 | Bytzek et al. | |
| 4,902,267 A | 2/1990 | Henderson | |
| 6,165,091 A | 12/2000 | Dinca et al. | |
| 6,506,137 B2 | 1/2003 | Guhr | |
| 6,652,401 B2 * | 11/2003 | Liu | F16H 7/1209 474/134 |
| 6,857,978 B2 * | 2/2005 | Polster | F16H 7/1209 474/134 |
| 6,960,145 B2 * | 11/2005 | Fraley, Jr. | B62D 5/0424 180/444 |
| 7,273,432 B2 | 9/2007 | Schonmeier et al. | |
| 7,367,908 B2 | 5/2008 | Lemberger et al. | |
| 7,494,434 B2 * | 2/2009 | Mc Vicar | F16H 7/1281 474/101 |
| 8,057,334 B2 * | 11/2011 | Kotzur | F16H 7/1281 180/65.21 |
| 8,075,433 B2 | 12/2011 | Quintus et al. | |
| 8,092,328 B2 * | 1/2012 | Dec | F16H 7/1218 474/135 |
| 8,142,315 B2 | 3/2012 | Dell | |
| 8,439,780 B2 * | 5/2013 | Ruffini | F16H 7/1281 474/112 |
| 2002/0039944 A1 * | 4/2002 | Ali | F16H 7/1209 474/135 |
| 2002/0086751 A1 * | 7/2002 | Bogner | F02B 63/04 474/134 |
| 2003/0176249 A1 * | 9/2003 | Polster | F16H 7/1209 474/134 |
| 2004/0171448 A1 | 9/2004 | Lemberger et al. | |
| 2006/0035738 A1 | 2/2006 | Bogner et al. | |
| 2006/0063626 A1 | 3/2006 | Kelm et al. | |
| 2006/0073926 A1 | 4/2006 | Kelm et al. | |
| 2006/0287146 A1 * | 12/2006 | McVicar | F16H 7/1281 474/109 |
| 2007/0006836 A1 | 1/2007 | Pflug et al. | |
| 2007/0010362 A1 | 1/2007 | Bogner et al. | |
| 2007/0037648 A1 * | 2/2007 | Di Giacomo | F16H 7/1281 474/134 |
| 2007/0161444 A1 | 7/2007 | Hartmann | |
| 2007/0163529 A1 | 7/2007 | Hartmann et al. | |
| 2007/0173361 A1 | 7/2007 | Schuseil | |
| 2008/0214342 A1 * | 9/2008 | Montani | F16H 7/1281 474/134 |
| 2008/0280713 A1 | 11/2008 | Fischer | |
| 2009/0298631 A1 * | 12/2009 | Jud | F16H 7/1281 474/237 |

FOREIGN PATENT DOCUMENTS

| | | |
|---|---|---|
| DE | 19849469 A1 | 5/2000 |
| DE | 19849886 A1 | 5/2000 |
| DE | 19524403 C2 | 9/2000 |
| DE | 19926612 A1 | 12/2000 |
| DE | 19926613 A1 | 12/2000 |
| DE | 19926615 A1 | 12/2000 |
| DE | 19926647 A1 | 12/2000 |
| DE | 10000970 A1 | 9/2001 |
| DE | 10045143 A1 | 2/2002 |
| DE | 10120448 A1 | 10/2002 |
| DE | 20023355 U1 | 12/2003 |
| DE | 10253450 A1 | 5/2004 |
| DE | 102004025936 A1 | 12/2005 |
| DE | 4040579 A1 | 2/2006 |
| DE | 4048629 A1 | 4/2006 |
| DE | 4058772 A1 | 7/2006 |
| DE | 4060015 A1 | 7/2006 |
| DE | 102007042501 A1 | 3/2009 |
| DE | 102008014325 A1 | 9/2009 |
| DE | 102008025552 A1 | 12/2009 |
| DE | 102010019613 A1 | 11/2011 |
| EP | 0757190 A1 | 5/1997 |
| EP | 1122464 A1 | 8/2001 |
| EP | 1303712 A1 | 4/2003 |
| EP | 01955320 A1 | 4/2003 |
| EP | 1464871 A1 | 10/2004 |
| EP | 1420192 B2 | 2/2007 |
| EP | 1322874 B1 | 1/2008 |
| EP | 2128489 B1 | 5/2009 |
| EP | 2385272 A1 | 11/2011 |
| JP | 09144821 A | 6/1997 |
| JP | 11-190223 A | 7/1999 |
| JP | 2001-59555 A | 3/2001 |
| JP | 2001-107827 A | 4/2001 |
| JP | 2001-193807 A | 7/2001 |
| JP | 2004-68973 A | 3/2004 |
| JP | 2004-84772 A | 3/2004 |
| WO | 0210615 A1 | 2/2002 |
| WO | 0229279 A2 | 4/2002 |
| WO | 2004059192 A1 | 7/2004 |
| WO | 2005100820 A1 | 10/2005 |
| WO | 2005100825 A1 | 10/2005 |
| WO | 2005106286 A1 | 11/2005 |
| WO | 2005106287 A1 | 11/2005 |
| WO | 2005114005 A1 | 12/2005 |
| WO | 2005116486 A1 | 12/2005 |
| WO | 2005119087 A1 | 12/2005 |
| WO | 2005119088 A1 | 12/2005 |
| WO | 2005119090 A1 | 12/2005 |
| WO | 2005121601 A1 | 12/2005 |
| WO | 2005121603 A1 | 12/2005 |
| WO | 2006000278 A1 | 1/2006 |
| WO | 2006002709 A1 | 1/2006 |
| WO | 2006005411 A1 | 1/2006 |
| WO | 2006005421 A1 | 1/2006 |
| WO | 2006005430 A1 | 1/2006 |
| WO | 2006012955 A1 | 2/2006 |
| WO | 2006018095 A1 | 2/2006 |
| WO | 2006021279 A1 | 3/2006 |
| WO | 2006032350 A1 | 3/2006 |
| WO | 2006037426 A1 | 4/2006 |
| WO | 2006037427 A1 | 4/2006 |
| WO | 2006037466 A1 | 4/2006 |
| WO | 2006099731 A1 | 9/2006 |
| WO | 2006061180 A2 | 11/2006 |
| WO | 2007025374 A3 | 4/2007 |
| WO | 2007059817 A1 | 5/2007 |
| WO | 2007088167 A1 | 8/2007 |
| WO | 2007106971 A1 | 9/2007 |
| WO | 2007118625 A1 | 10/2007 |
| WO | 2010037232 A1 | 4/2010 |
| WO | 2012049030 A1 | 4/2012 |

OTHER PUBLICATIONS

The Belt-Driven Starter Generator (RSG): An Innovative Funktionserweiter of the Ancillaries Drive, Jun. 1, 2004, M. Bonkowski, M. Bogner.
Elastogran—Innovations in Cellasto (Damping Applications) (Brochure), 2011, BASF.
BASF Elastogran CCF Foam—Vehicle Vibration Damping Applications, Jul. 1, 2011, BASF.
BASF Elastogran CCF Foam—Material Properties, Jul. 1, 2011, BASF.
Search Report and Written Opinion for PCT/CA2012/001033 (ISA), Feb. 11, 2013.
International Preliminary Report on Patentability for PCT/CA2012/001033 (ISA, Oct. 1, 2014.
Cellasto Components Complete Industrial Products Brochure (CCF), Unknown, PU Solutions Elastogran (BASF).
BASF Elastogran Closed Cell Foam Spring—Applications, Unknown, BASF.

* cited by examiner

1

TENSIONER AND ENDLESS DRIVE ARRANGEMENT

CROSS-REFERENCE TO RELATED APPLICATIONS

This application claims the benefit of U.S. patent application Ser. No. 13/434,787, filed Mar. 29, 2012, U.S. Provisional Patent Application No. 61/645,052, filed May 10, 2012, and U.S. Provisional Patent Application No. 61/655,474, filed Jun. 4, 2012, and U.S. Provisional Patent Application No. 61/699,694, filed Sep. 11, 2012, the disclosures of all of which are incorporated fully herein by reference.

FIELD

This disclosure relates generally to the field of tensioners for an endless drive, and more particularly to a belt drive arrangement for a starter-generator unit which uses a Y tensioner.

BACKGROUND

An ever increasing number of engines having a starter-generator unit have been developed since the 1990s in order to improve fuel mileage. In such engines, the combustion process is stopped when the vehicle comes to rest, for example, at a stoplight. In this condition the starter-generator unit is operated as a starter motor to restart the engine. Once the engine is started, the starter-generator unit can be selectively operated as a generator to recharge the batteries.

The starter-generator unit is mechanically connected to the engine via an endless drive such as a belt or chain. The endless drive is subject to tension fluctuations, particularly as the starter-generator unit shifts its function between starter and generator, in which case the tight side and slack side of the endless drive reverses. The endless drive tensioning system must handle this and other tension fluctuations that occur whilst the engine is operating.

Various dual arm tensioners are known in the art, example of which are found in publication numbers DE 102 53 450 A1; EP 1 464 871 A1; US 2004/0171448 A1; EP 1 122 464 A1; and DE 42 43 451 A1. However, a tensioner disclosed herein seeks to provide a more robust solution to effectively compensating for longitudinal shifts occurring in portions of the endless drive as a result of a changeover between the tight side and the slack side.

SUMMARY

In one aspect, a tensioner is provided, comprising, a first tensioner arm and a second tensioner arm, a first wheel and a second wheel. The first tensioner arm is pivotable about a first pivot axis. The second tensioner arm is pivotally connected to the first arm so as to be pivotable about a second pivot axis located at a selected distance from the first pivot axis. The first wheel is rotationally connected to the first tensioner arm about a first rotation axis. The second wheel is rotationally connected to the second tensioner arm about a second rotation axis. The first and second wheels are configured to engage an endless drive member. The first and second wheels are biased in respective first and second free arm directions.

In another aspect, an endless drive is provided, that incorporates an endless drive member and a tensioner as described above.

BRIEF DESCRIPTION OF DRAWINGS

The foregoing and other aspects will be more readily appreciated having regard to the accompanying drawings, wherein.

DETAILED DESCRIPTION OF EMBODIMENTS

Figure 1:
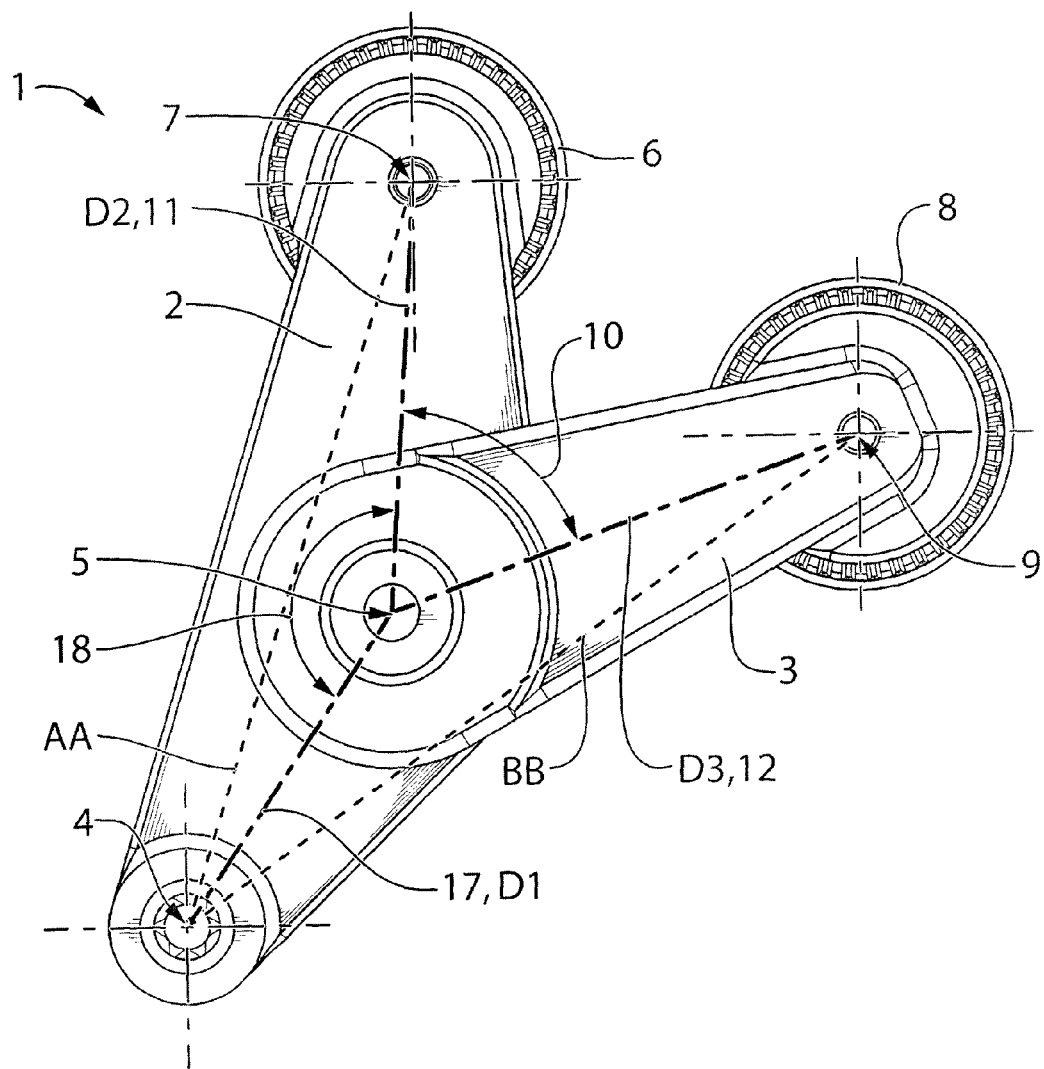
FIG. 1 is a top view of an embodiment of a tensioner.
Figure 3:
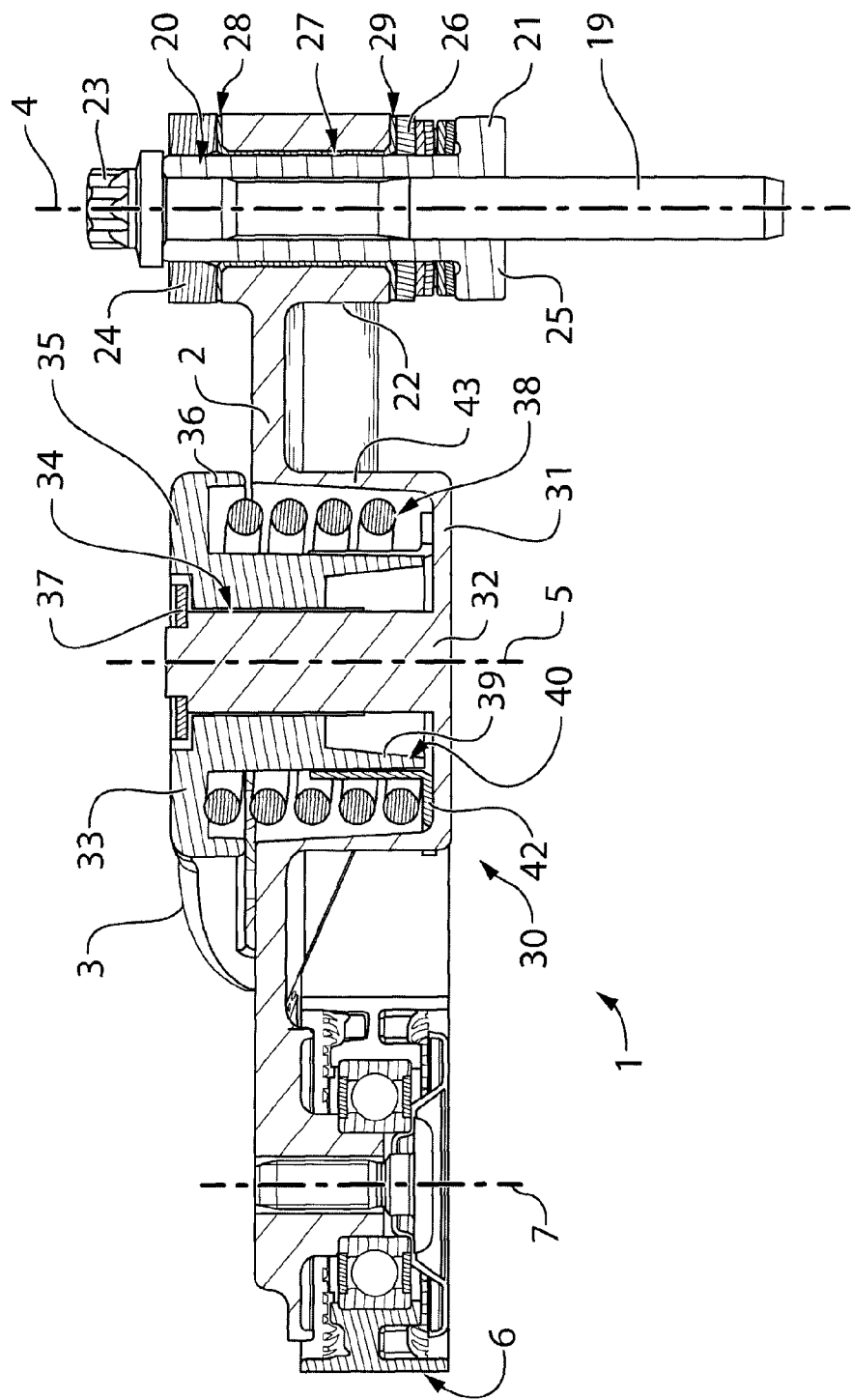
FIG. 3 is a cross-sectional view of the tensioner taken along a line shown in FIG. 2.
Figure 4:
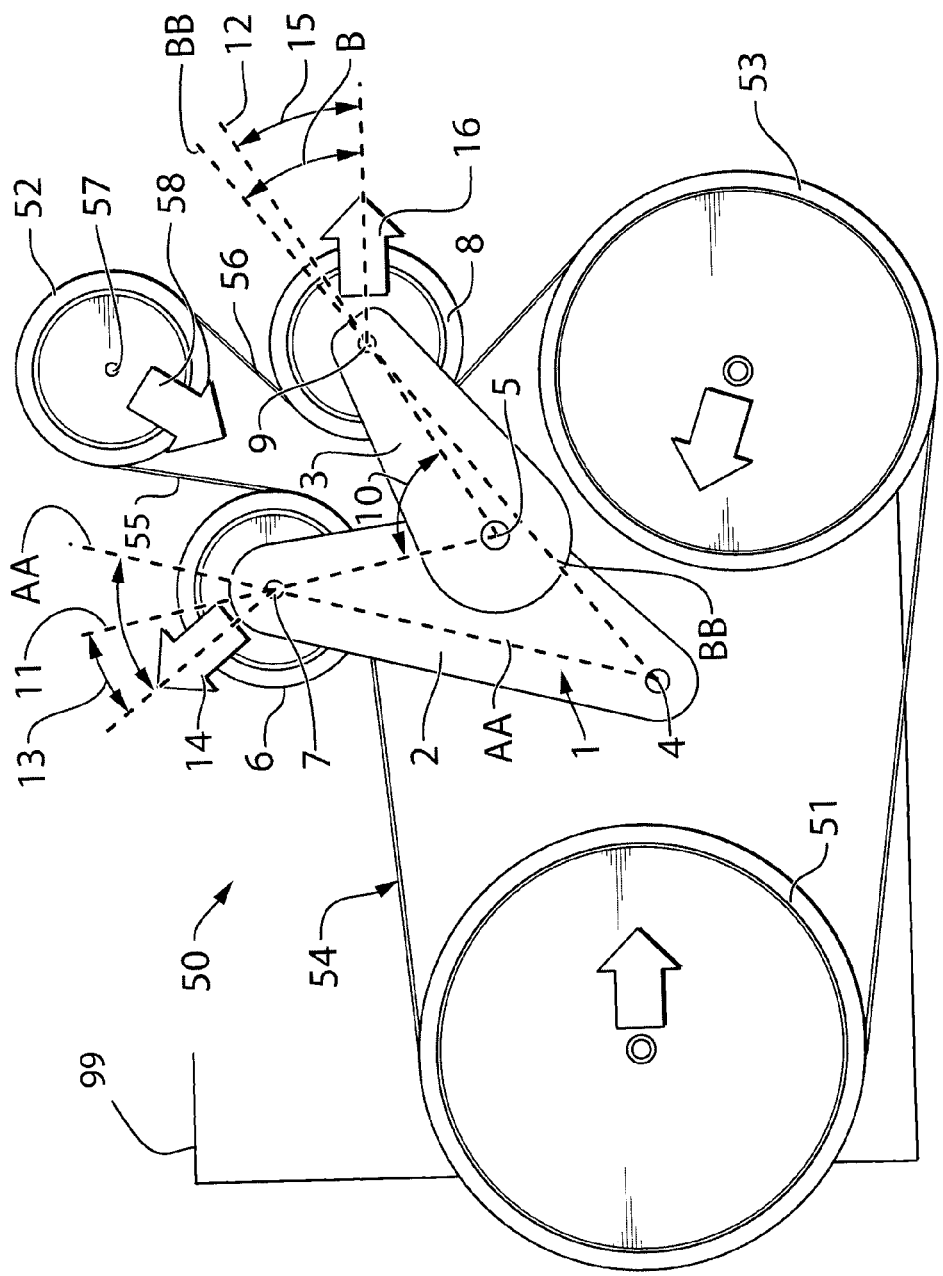
FIG. 4 shows a model of the tensioner shown in FIG. 1 in a starter-generator belt drive arrangement in an initial, quasi-static, position.

FIG. 1 is a top view of an embodiment of a tensioner 1 usable for tensioning an endless drive member 54 (FIG. 4). The tensioner 1 comprises a first tensioning arm 2 (which may be referred to as a primary tensioner arm) and a second tensioning arm 3 (which may be referred to as a secondary tensioner arm). The first tensioning arm 2 is pivotably mounted to a structural member, such as an engine block shown at 99 (FIG. 4) for pivoting movement about a first pivot axis 4. The second tensioning arm 3 is articulated to the first tensioning arm 2 so as to be pivotable about a second pivot axis 5. The first tensioning arm 2 supports a first tensioning wheel 6 that is rotatable about a first axis of rotation 7 and the second tensioning arm 3 supports a second tensioning wheel 8 that is rotatable about a second axis of rotation 9. The second tensioning arm 3 is biased in a second free arm direction by a tensioner spring 38 (FIG. 3) that extends between the second arm 3 and the first arm 2. The spring may also be considered to bias the first arm 2 (and the first pulley 6) in a first free arm direction. In general the free arm direction is the direction in which the arm 2 or 3 would travel if their movement was not resisted by the belt 54. In the embodiment shown, the arms 2 and 3 would move towards each other when moving in the free arm directions. The direction opposite to the free arm direction is the load stop direction. This is the direction in which the arm 2 or 3 is urged to move by the belt 54.

The second pivot axis 5 is located at a distance from the first pivot axis 4, that is, the second pivot axis is eccentric relative to the first pivot axis. More particularly, the location of the second pivot axis 5 is preferably offset from a line AA between the first pivot axis 4 and the first axis of rotation 7 and from a line BB between the second pivot axis 5 and the second axis of rotation 9.

The tensioning wheels 6, 8 may be in the form of pulleys and the endless drive member 54 may be in the form of a belt, such as a v-belt (which is but one example of a suitable asynchronous belt). Throughout this disclosure the term 'pulley' may be used in relation to wheels 6 and 8 and the term 'belt' may be used in relation to endless drive member 54, however it will be noted that these are used for convenience only and that they are but examples of types of endless drive member and wheels that could alternatively be used. For example, the endless drive member 54 may be a chain, or a toothed belt or some other type of endless drive member, and the wheels 6 and 8 could alternatively be sprockets, toothed pulleys or any other types of wheels.

The distance D1 between the first pivot axis 4 and the second pivot axis 5 is at least a quarter of the distance D2 between the second pivot axis 5 and the first axis of rotation 7 and/or the distance D3 to the second axis of rotation 9. Preferably, the distance D1 between the first pivot axis 4 and the second pivot axis 5 is at least a third, more preferably at least half of the distance D2 between the second pivot axis 5 and the first axis of rotation 7 and/or the distance D3 to second axis of rotation 9. Advantageously, the distance D1 between the first pivot axis 4 and the second pivot axis 5 can also be selected to be approximately as large as the distance D2 between the second pivot axis 5 and the first axis of rotation 7 and/or the distance D3 to second axis of rotation 9. In the present exemplary embodiment, the second pivot axis 5 is disposed at an approximately equal distance from the first pivot axis 4, the first axis of rotation 7 and the second axis of rotation 9, i.e., D1, D2 and D3 are approximately the same.

The greater the distance D1 between the first pivot axis 4 and the second pivot axis 5, the smaller can the distances D2 and D3 be between the second pivot axis 5 and the first axis of rotation 7 and the second axis of rotation 9. An opening angle 10 between a first line 11 connecting the second pivot axis 5 to the first axis of rotation 7 and a line 12 connecting the second pivot axis 5 to the second axis of rotation 9 can be selected to be appropriately larger, particularly when the tensioning pulleys 6, 8 are otherwise in the same position.

The opening angle 10 can be maintained in the range of 60° and 90°, for example. The larger the opening angle, the smaller are a first angle 13a (see FIG. 4) between a first hub load force introduced by means of the first tensioning pulley 6 and first line 11 (or angle α to line AA) as well as a second angle 15 (see FIG. 4) between a second hub load force introduced by means of the second tensioning pulley 8 and the second line 12 (or angle β to line BB). The smaller the first and the second angles 13 and 15 (or α and β), the higher is the respective resulting force component that is absorbed as tensile force by the tensioning arm in question. As a result, the spring force required for tensioning the tensioning arms 2, 3 becomes smaller. In the case of an opening angle 10 in the range of 60° to 90°, the tensioning arms do not open that markedly even when the belt tension increases sharply as a result of the operation of the belt drive arrangement. That is, the wrap angle of a pulley, of which the segment is tensioned by the tensioner 1, reduces less sharply.

In spite of that, longitudinal shifts occurring in the belt, for example, during a changeover between the tight side and the slack side, can be compensated for effectively by the tensioner 1 by means of the distance D1 between the first pivot axis 4 and the second pivot axis 5 as selected according to an embodiment.

In the present exemplary embodiment, the first line 11 and a third line 17 connecting the first pivot axis 4 to the second pivot axis 5 form an obtuse angle 18 (see FIG. 1) that is preferably in the range of 140° to 175°. As a result, it is possible to reduce the length of the second tensioning arm 3 as compared to a stretched form of the first tensioning arm 2 and consequently, a larger opening of the opening angle 10 is possible, particularly when the tensioning pulleys 6, 8 are in an otherwise same position. This additionally favors the maintenance of a good wrap angle and allows further reduction in the force required for tensioning the two tensioning arms 2, 3.

However, it is also possible to provide an angle 18 that is greater than 175° or even an angle of 180° between the first and the third lines 11, 17. In other embodiments, it would also be possible to provide an angle of 140° to 175° or greater between the third and the first lines 17, 11 on both sides of the second tensioning pulley 8. Generally speaking, the angle 18 between the first and the third lines 11, 17 can be in the range of 180°+/−40°.

Figure 2:
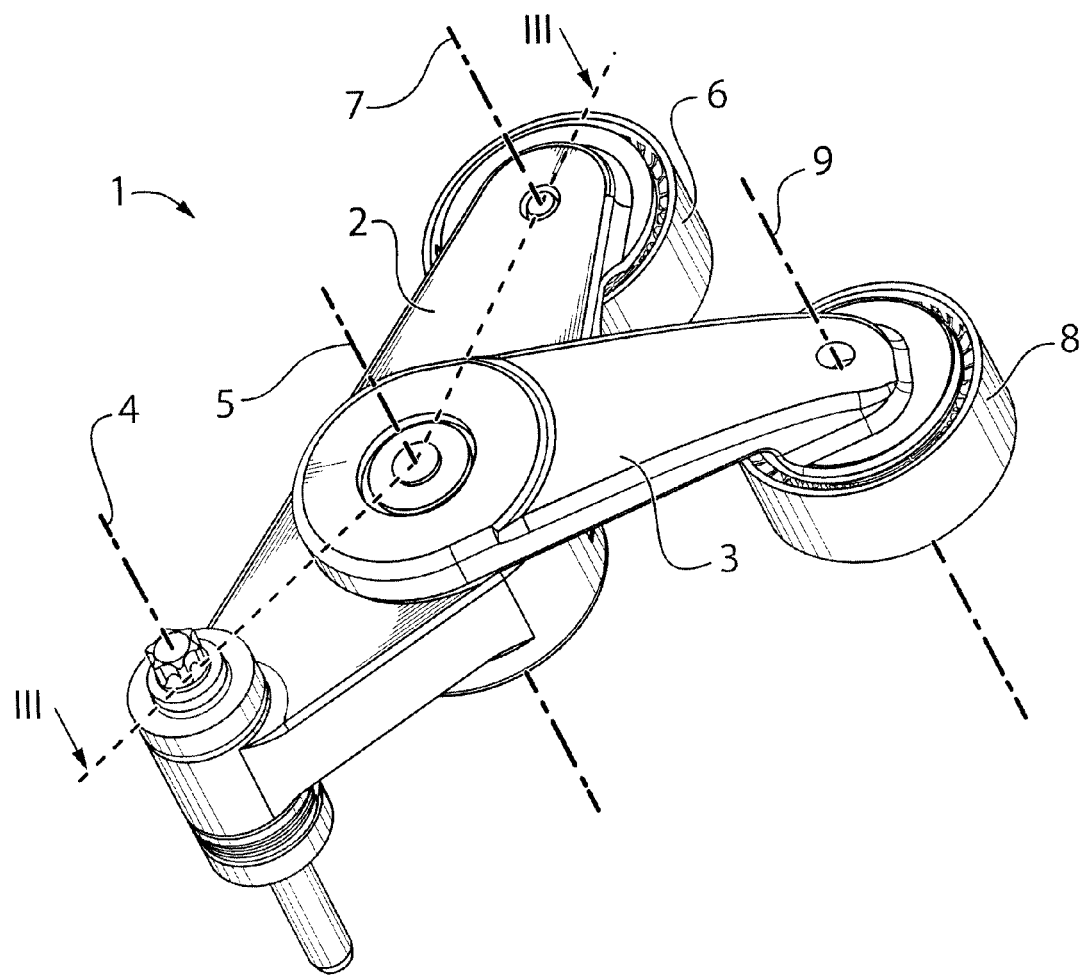
FIG. 2 is a perspective view of the tensioner shown in FIG. 1.

FIG. 2 is a perspective view of the tensioner 1. It can be seen clearly that a spring that tensions the tensioning arms 2 and 3 and that is accommodated in the region of the second pivot axis 5 occupies less installation space. Thus the lesser the spring force required for tensioning purposes and thus the weaker the necessary spring itself, the smaller the required installation space. That is, the design of the tensioner 1 suggested by the preferred embodiment and the resulting reduction in the necessary tensioning force also leads to a reduction in construction volume.

FIG. 3 is a cross-sectional view of the tensioner 1 taken along a line III-III marked in FIG. 2. The tensioner 1 can be mounted, for example, on an internal combustion engine by means of a mounting screw 19 extending through a bearing bolt 20 on which a base plate 21 is provided integrally. The bearing bolt 20 extends through a bearing eye 22 of the first tensioning arm 2. The bearing bolt 20 extends further on the side of a head 23 of the mounting screw 19 through a front plate 24. On the opposite side, the bearing bolt 20 extends additionally through a laminated disk spring 25 resting against the base plate 21 and through a pressing disk 26 resting against the laminated disk spring 25. Between the bearing eye 22 and the bearing bolt 20 there is provided a bearing bush 27 that has radially outwardly extending flanges 28, 29 at its opposing ends. The bearing bush 27 is a one-part component in an embodiment, but it can also be bipartite.

The bearing bush 27 has a dual function. First, it supports the first tensioning arm 2 so as to be free to rotate. Second, it damps its rotational movement by means of friction damping.

More particularly, the friction damping is produced with the help of the two flanges 28, 29, the laminated disk spring 25 pressing the friction partners of the flanges 28, 29 against the same, namely the front plate 24 and the bearing eye 22 on the one hand and the pressing disk 26 and the bearing eye 22 on the other.

Instead of the flanges 28, 29, provision can also be made for separate damping disks for the bearing bush 27 that can be in the form of Teflon-coated steel disks, for example, as shown, for example, in U.S. Patent Publication No. 2008/0280713, and German patent no. DE1952 4403.

The first tensioning arm is freely rotatable about the first pivot axis 4, that is, without being spring-biased.

The first tensioning arm 2 comprises an approximately cup-shaped spring housing 30. A second bearing bolt 32 extends integrally from a base 31 of the spring housing. The second bearing bolt 32 extends through a bearing eye 33 of the second tensioning arm 3. Between the bearing eye 33 and the second bearing bolt 32 there is provided a second bearing bush 34 by means of which the second tensioning arm 3 is mounted on the second bearing bolt 32 so as to be free to rotate. A spring cover 35 comprising a collar 36 that protrudes axially toward the base 31 extends radially outwards from the bearing eye 33 of the second tensioning arm 3. The bearing eye 33 and the spring cover 35 formed integrally therewith are secured by a second front plate 37 axially on the second bearing bolt 32 against an axial force of the tensioner spring 38 (which may be, for example, a helical coil torsion spring as shown in FIG. 3 or any other suitable type of spring, such as is described below in relation to FIGS. 11a-11j).

In the present embodiment, the second bearing bolt 32 is cylindrical in shape. It is also possible to provide a cone bearing instead that tapers in the direction extending away from the base 31. Instead of the cylindrically hollow second bearing bush 34, a bearing bush tapering in the direction extending away from the base 31 would then be provided and an internal peripheral surface of the bearing eye corresponding to the external peripheral surface of this bearing bush would likewise taper in the direction extending away from the base 31. An example of such structure is found in U.S. Pat. No. 4,698,049.

The coil spring 38 loads the tensioning arms 2, 3 toward each other. The stronger the tensioning arms 2, 3 are pushed apart by belt forces, the greater is the reduction in the diameter of the coil spring 38. As a result, the coil spring strongly wraps around a slotted damping bush 40 provided between the coil spring and an axial extension 39 of the bearing eye 33. That is, the coil spring 38 increases the force with which the damping bush 40 rubs against the bearing eye 33 of the second tensioning arm 3, more particularly against its axial extension 39, as a result of which the damping force increases. A bottom end 41 of the coil spring 38 is provided for a radially outwardly extending flange 42 of the damping bush 40 for rotation therewith.

Alternatively, the spring 38 could be provided such that it widens radially when the tensioning arms 2, 3 are pushed apart by belt forces. Then a damping bush can be provided between the coil spring and a cylinder wall 43 of the spring housing 30 and said damping bush can rotate relative to the cylinder wall 43 and rub against the same when the tensioning arms pivot relative to each other. An example of such structure is found in U.S. Pat. No. 8,142,314, the contents of which are incorporated by reference herein.

Figure 5:
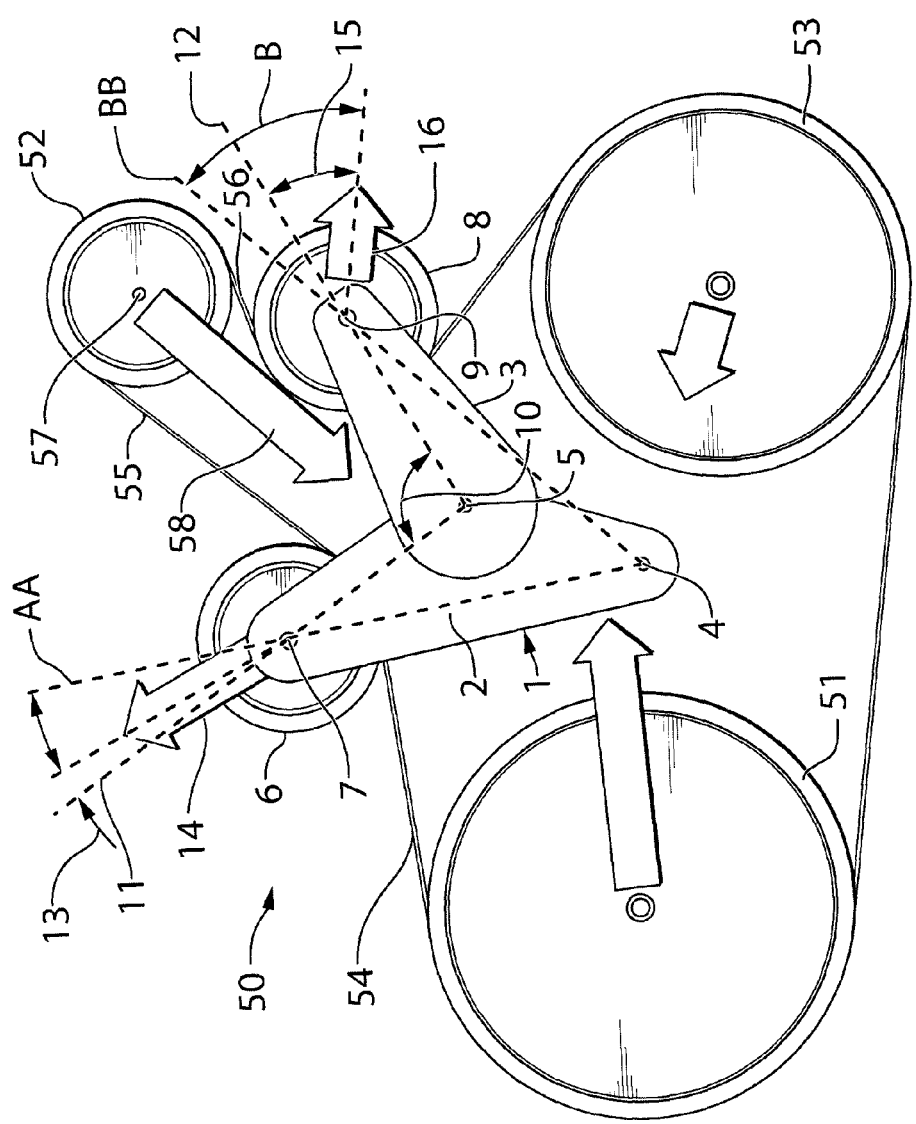
FIG. 5 shows a model of the tensioner in the belt drive arrangement of FIG. 4 in a first position where the starter-generator operates as a starter.
Figure 6:
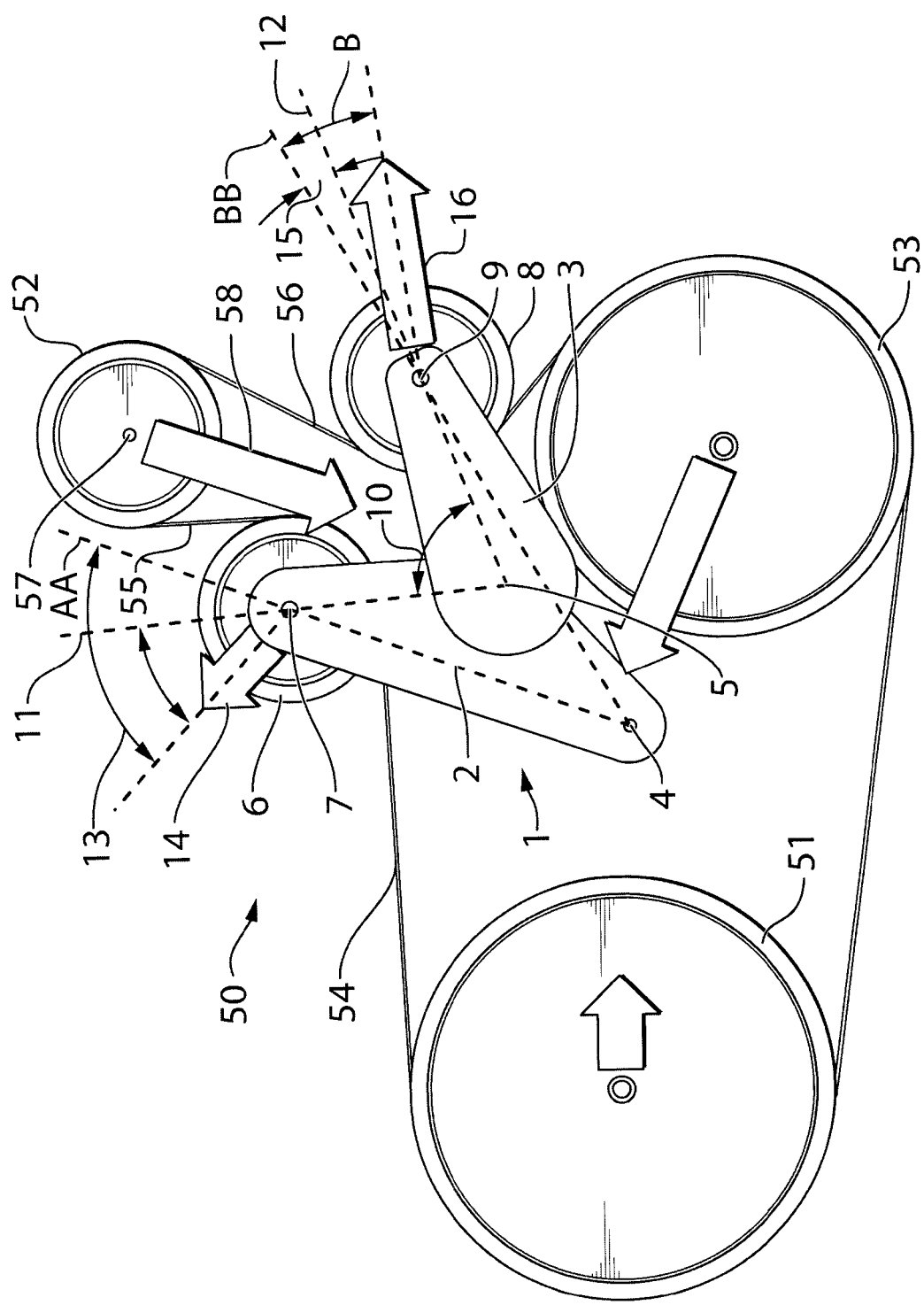
FIG. 6 shows the model of the tensioner in the belt drive arrangement of FIG. 4 in a second position where the starter-generator operates as a generator.
Figure 7:
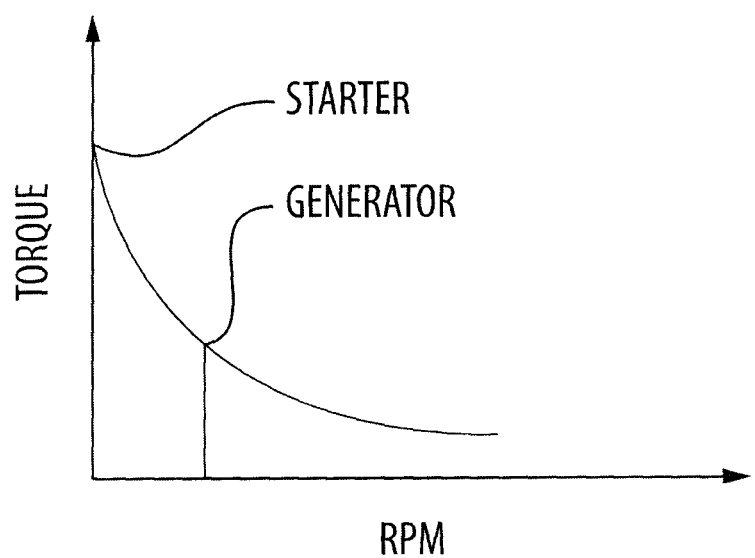
FIG. 7 shows the torque characteristics of a starter-generator unit.

FIGS. 4 to 6 show a simulation model of an exemplary belt drive arrangement 50 and a simulation model of the preferred tensioner 1 in various operating states. By way of example, the belt drive arrangement comprises a crankshaft pulley 51 connected to a crankshaft of an internal combustion engine, a pulley 52 of a starter-generator unit and an additional pulley 53 that can be connected to an air-conditioning compressor, for example. In this example, the starter-generator unit is an electric generator for generating electricity and it can also operate as an electric motor for starting the engine. FIG. 7 schematically shows a representative torque curve for a conventional starter-generator unit from which it will be appreciated that when the unit operates as a motor the peak torque on pulley 52 is quite high and when the unit operates as a generator the peak torque on pulley 52 is relatively lower.

A belt 54 is mounted around the pulleys in the routing shown in FIG. 4. In the embodiment shown in FIG. 4, the belt 54 is tensioned by the first tensioning pulley 6 which rests against a first belt segment 55 that extends between the crankshaft pulley 51 and the pulley 52 of the starter-generator unit (which may be referred to as the SGU pulley 52), and by the second tensioning pulley 8 which rests against a second belt segment 56 that extends between the SGU pulley 52 and the pulley 53 of the air-conditioning compressor (which may be referred to as the a/c compressor pulley 53). The tensioning pulleys 6, 8 press against the belt segments 55, 56 from the outside.

In FIG. 4, the tensioner 1 is in a tensioning initial position. The engine is running and the generator load of the starter-generator unit is zero, i.e., the system is in a quasi-static state. Note that in this state the hub load force 58 (the load on the shaft of pulley 52) is directed substantially along a line that passes through the first pivot axis 4.

When the starter-generator unit is employed in a boost function in order to additionally drive the crankshaft to start the engine, the starter-generator unit must drag the engine by means of the crankshaft pulley 51. The first belt segment 55 becomes the tight side and it is tensioned. By contrast, the second belt segment 56 becomes the slack side and it is relieved of tension. In general, when one segment of the belt 54 is referred to as the tight side and one segment of the belt is referred to as the slack side, it will be noted that these terms are in relation to each other. In other words, when the second segment 56 of the endless drive member 54 is the 'tight side', it means that the second segment 56 is under higher tension than the first segment 55, and when the first segment 55 of the endless drive member 54 is the 'tight side' the first segment 55 is under higher tension than the second segment 56.

The tensioner 1 pivots about the first pivot axis 4 toward the first belt segment 55 and it thus compensates the resulting longitudinal shift of the belt segments, namely the shortening of the first belt segment 55 and the lengthening of the second belt segment 56. After the pivoting movement, the tensioner 1 is in a position as seen in FIG. 5 that differs from the initial position shown in FIG. 4. The first angle 13 between a first hub load force 14 on the first pulley 6 and the first line 11 has dropped to a value of less than 30°, even a value less than 25° in the present exemplary embodiment. Likewise, the angle α between force 14 and line AA has dropped. Thus a significant component of the first hub load force 14 is absorbed in the form of a tensile force by the first tensioning arm 2 and by the bearing that is part of the first pivot axis 4. Only a small component of the first resulting force acts at right angles to the first line 11 or line AA and it must be absorbed by the coil spring 38 tensioning the two tensioning arms, the second tensioning arm 3 being supported appropriately by means of its second tensioning pulley 8 against the second belt segment 56.

A second hub load force 16 acting on the second tensioning pulley 8 is small and the necessary tension in the second belt segment 56 is maintained easily by the coil spring 38.

The opening angle 10 is substantially constant as compared to the illustration shown in FIG. 4. It has opened only slightly by less than 10°, and by less than 5° in the present exemplary embodiment. Thus the wrap angle of the belt 54 around the pulley 52 remains substantially constant so that the force-transmission capacity between the belt 54 and the pulley 52 is substantially constant.

A similar operating state as the one shown in FIG. 5 occurs when the engine is started by the starter-generator unit.

The starter-generator unit must be driven by the internal combustion engine by means of the belt 54 when it switches from the starter or engine mode to the generator mode. The second belt segment 56 becomes the tight side and it is tensioned. By contrast, the first belt segment 55 becomes the slack side and it is relieved of tension. The tensioner 1 pivots about the first pivot axis 4 toward the second belt segment 56 and it thus compensates the longitudinal shift of the belt segments, namely the shortening of the second belt segment 56 and the lengthening of the first belt segment 55. On completion of the pivoting movement, the tensioner 1 achieves a second position as seen in FIG. 6 that differs from the initial position shown in FIG. 4. The second hub load force 16 is greater than the first hub load force 14. The second angle 15 has reduced to a value that is clearly less than 30°, and even to a value less than 20°. In the illustrated embodiment, it is less than 15°. Likewise the angle β between force 16 and line BB has dropped in comparison to FIG. 4. As a result, the orthogonal component about the pivot axis 5 is reduced, reducing the tendency of the arms 2, 3 to open for a given unit force. In addition, a significant component of the second hub load force 16 is introduced in the form of a tensile force into the second tensioning arm 3 and into the first tensioning arm 2 by means of the bearing that is part of the second pivot axis 5. This force is absorbed, on the one hand, by the bearing that is part of the fixed first pivot axis 4 and, on the other hand, by virtue of the fact that the first tensioning arm 2 is supported against the first belt segment 55 by means of the first tensioning pulley 6. In spite of that, the first hub load force 14 is less than the second hub load force 16. The coil spring 38 can easily compensate the orthogonal components of the hub load forces 14, 16 that push the tensioning arms apart.

The eccentric arrangement of the second pivot axis 5 helps in this arrangement because a significant component of the second hub load force 16 is directed along line BB passing through the first pivot axis 4, which is fixed in position.

The system shown in FIGS. 4-6 can be mathematically understood by the following simplified equations.

The torque about pivot axis 4, which sets the angular position of the system as a whole, is $$L_{4,7} \times F_{14} + L_{4,9} \times F_{16} = 0, \text{ or}$$

$$L_{4,7} \times F_{14} \cdot \sin \alpha = L_{4,9} \times F_{16} \cdot \sin \beta$$

where $L_{4,7}$ is a vector between axes 4 and 7; $L_{4,9}$ is a vector between axes 4 and 9.

The torque about pivot axis 5, which determines the opening angle 10, is $$L_{5,9} \times F_{16} = k \cdot (\theta_p + \theta_{10}), \text{ or}$$

$$L_{5,9} \cdot F_{16} \cdot \sin \theta_{15} = k \cdot (\theta_p + \theta_{10})$$

where $L_{5,9}$ is a vector between axes 5 and 9; $\theta_{10}$ is the opening angle 10 and $\theta_p$ is a preload angle (in the case where the spring delivers a preload torque).

From the foregoing it will be seen that when the tensioner 1 switches to the second position, the opening angle 10 does not alter substantially. As compared to the operating state shown in FIG. 5, the opening angle 10 has reduced here by less than 10° and even by less than 5° in this case. This contributes toward maintaining a good wrap angle.

The wrap-around angle of the pulley 52 of the starter-generator unit has increased additionally as a result of the geometry of the tensioner and the positioning of the pivot axis 4. The first pivot axis 4 is provided at a position in which the first tensioning pulley 6 reduces its distance from the pulley 52 of the starter-generator unit when the tensioner 1 pivots from the first position (FIG. 5) into the second position (FIG. 6). The first axis of rotation 7 pivots toward a line (not referenced in the drawings) between the first pivot axis 4 and an axis of rotation 57 of the pulley 52.

In addition, the geometry of the tensioner may be selected such that the distance of the second axis of rotation 9 from the pivot axis 4 is somewhat smaller than the distance of the first axis of rotation 7 from the first pivot axis 4. Thus the first tensioning pulley 6 draws close to the pulley 52 of the starter-generator unit more strongly than the second tensioning pulley 8 moves away from the pulley 52 of the starter-generator unit when the tensioner pivots into the second position.

In the preferred embodiment, the first tensioning arm 2 is assigned to the segment in which maximum belt tension occurs during the operation of the belt drive arrangement, namely the first belt segment 55. Thus a significant component of the maximum resulting force is introduced in the form of tensile force into the first tensioning arm 2 and is directly absorbed by the bearing of the tensioner 1 that is part of the first pivot axis 4. This likewise contributes toward a reduction in the spring force required for tensioning the two tensioning arms.

From the foregoing, it will be appreciated that a tensioner as disclosed herein can maintain a good wrap angle around an endless driving wheel by means of the tensioning arms that are spring-biased toward each other even during a changeover between the tight side and the slack side, and the tensioner 1 can effectively compensate longitudinal shifts in portions of the endless drive accompanying this changeover by means of the eccentricity between the first and the second pivot axes. Furthermore, it is possible for this tensioner at the same time to realize a moderate level of basic tension of the endless drive.

The tensioner 1 can be moved between a first position, in which, when the first segment is the tight side, a resulting force on the first tensioning pulley and a line connecting the second pivot axis to the first axis of rotation forms a first angle that is smaller than 30°, and a second position, in which, when the second segment is the tight side, a resulting force on the second tensioning pulley and a line connecting the second pivot axis to the second axis of rotation forms a second angle that is smaller than 30°. By virtue of the fact that the first angle is smaller than 30° when the first segment is the tight side and the second angle is smaller than 30° when the second segment is the tight side, a considerable component of the resulting force in question is absorbed by the respective tensioning arm in the form of a tensile force. Thus less spring force is required for tensioning the two tensioning arms. The basic tension level of the endless drive is reduced as a result of the reduced spring tension force.

Advantageously, the first angle in the first position and/or the second angle in the second position can be smaller than 25°, preferably smaller than 20°, and even more preferably smaller than 15°. The smaller the angle, the higher is the component of the resulting force that can be absorbed by the tensioning arm in question in the form of a tensile force. Accordingly, it is possible to use a smaller amount of spring tension force for tensioning the two tensioning arms, as a result of which the level of basic tension of the endless drive can be reduced still further. In spite of that, the tensioner is able to effectively attenuate tension peaks in the endless drive.

Preferably, the first tensioning arm can be assigned to the segment, in which the maximum tension occurs during the operation of the endless drive arrangement. Thus a large component of the resulting force on the first tensioning pulley can be absorbed by the bearing of the tensioner on the first pivot axis. Thus a smaller amount of spring force is sufficient for tensioning the tensioning arms, as a result of which the level of basic tension of the endless drive can be reduced.

Advantageously, an angle formed between a line connecting the second pivot axis to the first axis of rotation and a line connecting the second pivot axis to the second axis of rotation during a movement of the tensioner from a first position, in which the first segment is the tight side, into a second position, in which the second segment is the tight side, and/or vice versa remains substantially constant. Thus only a small amount or no amount of spring work is required during a changeover between the tight side and the slack side, and the wrap angle around the endless driving wheel remains substantially constant.

Very advantageously, the angle can alter by less than 10°, and preferably by less than 5°. The smaller the amount by which the angle alters, the lesser is the spring work required and the better is the wrap angle retained.

Very advantageously, an angle formed between a line connecting the second pivot axis to the first axis of rotation and a line connecting the second pivot axis to the second axis of rotation can range from approximately 60° to 90°. Thus force can be absorbed effectively on the respective tensioning arm tensioning the tight side, a considerable component of the resulting force on the tensioning pulley in question being absorbed in the form of a tensile force by the tensioning arm in question, as a result of which it is possible to apply lesser spring force to the tensioning arms.

Advantageously, the endless driving wheel can be part of that equipment assembly of the endless drive arrangement which has the greatest moment of inertia and/or the greatest rotational non-uniformities. Thus longitudinal shifts in the endless drive can be compensated very effectively.

Preferably, the endless driving wheel can be part of the starter-generator unit. In a starter-generator unit, the segment switches between the tight side and the slack side during a changeover of the starter-generator unit from the starter mode to the generator mode and vice versa. Thus the accompanying longitudinal shifts in the endless drive are compensated at the locus of their origin.

Preferably, the distance of the first pivot axis from the second pivot axis can be at least a quarter of the distance of the second pivot axis from the first axis of rotation and/or the second axis of rotation. Thus a tensioner as disclosed herein achieves a performance characteristic that differs clearly from that of a conventional two-armed tensioner comprising tensioning arms disposed in a V-shaped arrangement, that is to say, comprising only one pivot axis. As a result of the reduction in the distance between the axes of rotation from the pivot axis responsible for the relative rotation of the tensioning arms, the angle between a line connecting the first axis of rotation to the second pivot axis and a line connecting the second axis of rotation to the second pivot axis is large enough to absorb a considerable component of the resulting force of the tensioning pulley that tensions the tight side by means of the articulated connection of the second pivot axis. As a result, lesser spring tension force is required for tensioning the endless drive, that is to say, a clearly reduced level of basic tension is possible in the endless drive. At the same time, the aforementioned geometry contributes toward maintaining a good wrap angle. In spite of that, the tensioner is able to effectively attenuate tension peaks occurring in the endless drive. By means of the distance between the first and the second pivot axes, the tensioner can compensate longitudinal shifts in the endless drive when there is a changeover between the tight side and the slack side. Consequently, such a tensioner as disclosed herein enables distances to be realized between the axes of rotation and the second pivot axis, which would have made it difficult for a conventional tensioner comprising tensioning arms disposed in a V-shaped arrangement and only one pivot axis or a tensioner behaving almost like such a V-shaped tensioner to effectively compensate longitudinal shifts in the endless drive during a changeover between slack side and tight side without excessively reducing the wrap angle or without excessively increasing the level of basic tension of the endless drive.

Advantageously, the distance of the first pivot axis from the second pivot axis can be at least a third, preferably at least half of the distance of the second pivot axis from the first axis of rotation and/or the second axis of rotation. The wrap angle can then be retained even better and the spring tension force required for tensioning the two tensioning arms can be reduced still further. At the same time, the tensioner compensates longitudinal shifts in the endless drive effectively.

Very preferably, the distance of the first pivot axis from the second pivot axis can be approximately as large as the distance of the second pivot axis from the first axis of rotation and/or the second axis of rotation. In this arrangement, the wrap angle can be maintained particularly effectively, it being possible for the force required for tensioning the two tensioning arms to be reduced once again. At the same time, the tensioner can effectively compensate tension peaks and longitudinal shifts in the endless drive during a changeover between the tight side and the slack side.

Advantageously, a line connecting the first and second pivot axes and a line connecting the second pivot axis to the first axis of rotation form an obtuse angle, preferably an angle ranging from approximately 140° to 175°. As a result, the length of the second tensioning arm can be shorter compared to a stretched form of the first tensioning arm, and a greater opening of the angle between the two tensioning arms is possible consequently. This proves advantageous for maintaining a good wrap angle and enables a further reduction in the force required for tensioning the two tensioning arms.

Very advantageously, provision can be made for a damping bush along a periphery of a coil spring that spring-loads the first and the second tensioning arms relative to each other, and the coil spring presses against this damping bush radially when its diameter alters during a movement of the tensioning arms relative to each other. Thus a damping effect is achieved that alters increasingly with the increasing change in the diameter of the coil spring.

Very preferably, the distance of the first pivot axis from the second pivot axis can be at least a third, and even more preferably at least half of the distance of the second pivot axis from the first axis of rotation and/or the second axis of rotation.

Very advantageously, the distance of the first pivot axis from the second pivot axis can be approximately as large as the distance of the second pivot axis from the first axis of rotation and/or the second axis of rotation.

Advantageously, a line connecting the first and the second pivot axes and a line connecting the second pivot axis to the first axis of rotation form an obtuse angle, preferably an angle ranging from approximately 140° to 175°.

Very advantageously, an angle formed between a line connecting the second pivot axis to the first axis of rotation and a line connecting the second pivot axis to the second axis of rotation can range from approximately 60° to 90°.

Very preferably, provision can be made for a damping bush along a periphery of a coil spring that spring-loads the first and the second tensioning arms relative to each other, and the coil spring presses against this damping bush radially when its diameter alters during a movement of the tensioning arms relative to each other.

Figure 8:
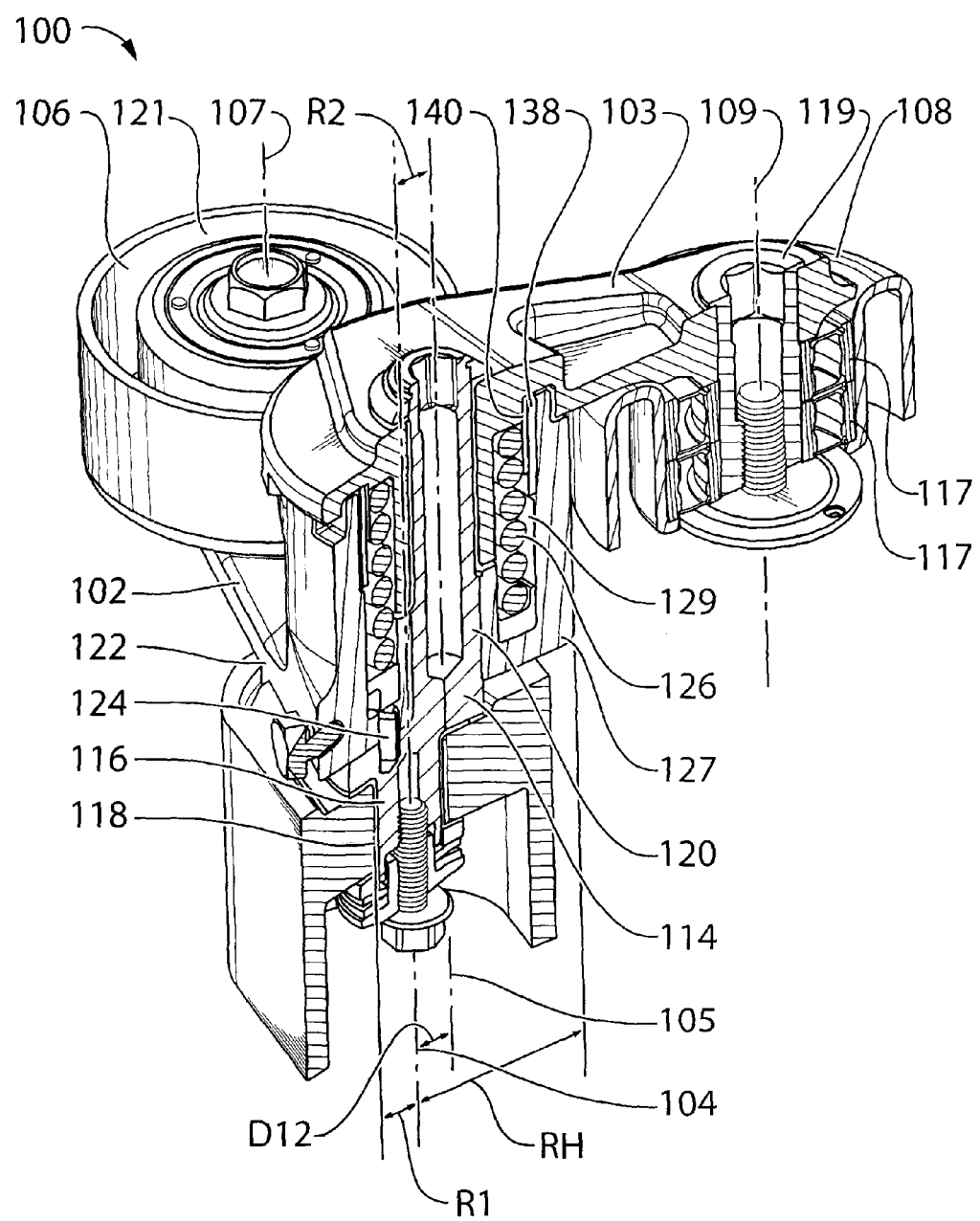
FIG. 8 is a perspective view of another embodiment of a tensioner.

Reference is made to FIG. 8, which shows another embodiment of a tensioner 100. The tensioner 100 includes a first tensioning arm 102 and a second tensioning arm 103. The first tensioning arm 102 is pivotable about a first pivot axis 104. The second tensioning arm 103 is pivotable about a second pivot axis 105 that is on the first tensioning arm 102. The first tensioning arm 102 supports a first tensioning wheel, (e.g. such as a pulley 106) that is rotatable about a first axis of rotation 107 (via bearings 111, shaft 113 and bearing retainer 115 shown in FIG. 9b) and the second tensioning arm 103 supports a second tensioning wheel (e.g. such as a pulley 108) that is rotatable about a second axis of rotation 109 via bearings 117, shaft 119 and bearing retainer 121.

Figure 9A:
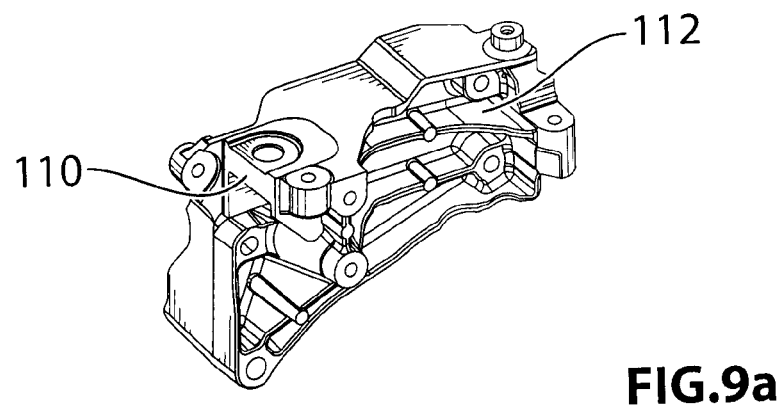
FIG. 9a is a perspective view of a portion of the tensioner shown in FIG. 8.

The tensioner 100 further includes a base 110 which mounts fixedly to a stationary member shown at 112 (FIG. 9a). The stationary member 112 may be any suitable stationary member, such as, for example, a portion of the engine block 99 (FIG. 4). A shaft member 114 (FIG. 8) that forms part of the first tensioner arm 102 defines both the first and second pivot axes 104 and 105. The shaft member 114 has a first shaft 116 that is pivotable relative to the base 110 by means of a bushing 118, which defines the first pivot axis 104. The shaft member 114 further includes a second shaft 120 that is radially offset from the first shaft 116 by a selected distance. The second tensioner arm 103 is pivotally mounted to the second shaft 120 for pivotal movement about the second pivot axis 105. Thus the second shaft 120 defines the second pivot axis 105.

The shaft member 114 may be considered to be a first portion of the first tensioner arm 102, which lockingly connects to a second portion of the tensioner arm 102, shown at 122. The locking connection may be by any suitable means. For example, the second tensioner arm portion 122 of the tensioner arm 102 may snuggly but not tightly mount to the second shaft 120, and a dowel pin 124 may pass through the shaft member 114 and the second tensioner arm portion 122 at a point that is radially offset from the second shaft 120 thereby holding the two elements 114 and 122 together rotationally. Alternatively, the second tensioner arm portion 122 may be press-fit onto the second shaft 120 sufficiently tightly that the two become locked together rotationally.

While the term 'pulley' is used for elements 106 and 108 herein, it will be understood that elements 106 and 108 may instead be sprockets (where the endless drive member 54 is a chain) or any other type of wheel that engages any other type of endless drive member.

Tensioner Spring Configurations

A tensioner spring 126 is positioned to bias the second tensioner arm 103 (and the second pulley 108) in a selected direction (i.e. a second free arm direction) relative to the first tensioner arm 102. In the embodiment shown in FIG. 8 the tensioner spring 126 is a cylindrically coiled torsion spring, and has a first end 128 (FIG. 9b) that is configured to engage the first tensioner arm 102 via a spring insert 130. The spring insert 130 may be adjustable in position via a threaded fastener 132 that passes through an aperture 134 in the first tensioner arm 102 to abut the spring insert 130. Thus, forces exerted by the spring 126 on the spring insert 130 are passed from the spring insert 130 to the threaded fastener 132 and from the threaded fastener 132 to the first tensioner arm 102. In this way, the first tensioner arm 102 and the spring 126 are operatively engaged with each other. The spring insert 130 may be made from any suitable material such as a polymeric material. While the threaded fastener 132 and the spring insert 130 permits adjustment of the spring force applied by spring 126, in some embodiments the threaded fastener 132 and the spring insert 130 may be omitted.

The tensioner spring 126 further has a second end 136 that engages the second tensioner arm 103. A spring support 138 and a noose ring 140 may be provided about the coils of the spring 126 near the second end 136 of the spring 126. As the spring 126 uncoils and radially expands during use, the spring support 138 and noose ring 140 together act as a damping mechanism that frictionally engages the spring 126 and that frictionally engages a surface of the first tensioner arm 102.

Figure 10:
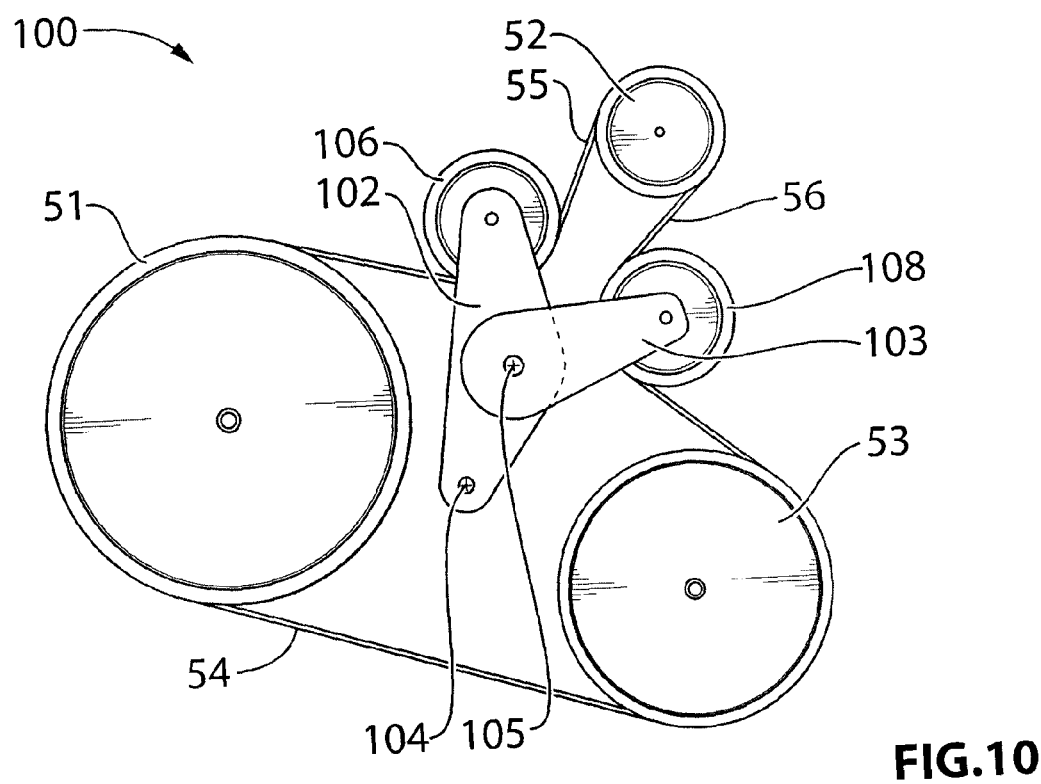
FIG. 10 is a plan view of the tensioner shown in FIG. 8.

The tensioner spring 126 is positioned to resist spreading of the tensioning arms 102 and 103 away from each other by the belt shown at 142 in FIG. 10. In that sense, the tensioner spring 126 may be said to bias the first arm 102 and the first pulley in a first free arm direction. As the belt tension changes in belt segments 55 and 56 the spring 126 would coil or uncoil until an equilibrium was achieved. While the tensioner shown in FIG. 10 is identified at 100, it will be noted that the discussion regarding FIGS. 10-21 apply to tensioner 1 also. For greater certainty, it will be noted that FIGS. 10-21 are intended to be representative of both tensioners 1 and 100, however reference numerals that are specific to tensioner 1 have been omitted so as to simplify these figures.

In the embodiment shown in FIG. 8 there is no spring that biases the first tensioner arm 102 towards a particular rotational position about pivot axis 104. Thus, during an event that causes a change in the belt tension in one or both segments 55 and 56, the first tensioner arm 102 can pivot as needed about the pivot axis 104 as the tensioner 100 reaches an equilibrium position.

Figure 9B:
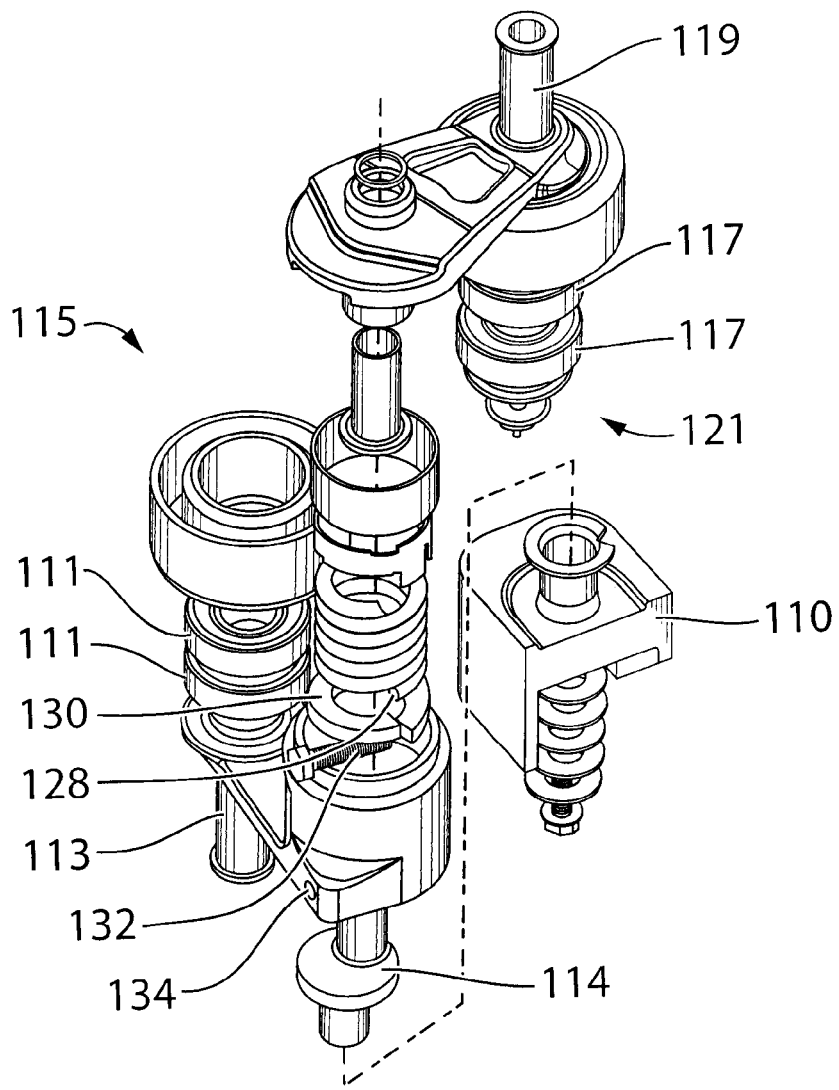
FIG. 9b is an exploded view of the tensioner shown in FIG. 8.

While a cylindrically coiled torsion spring is shown in FIGS. 8 and 9b, other types of tensioner spring may be used instead.

Figure 11A:
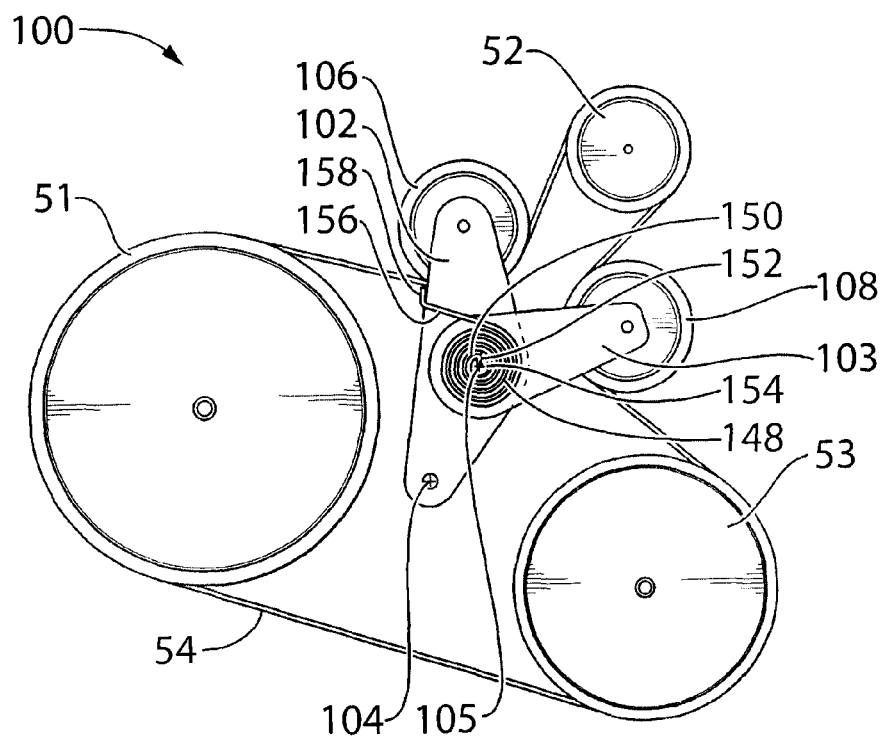
FIGS. 11a-11j are plan and elevation views of alternative biasing members that may be used as part of the tensioner shown in FIG. 8.

For example, in the embodiment shown in FIG. 11a, the tensioner spring may be a 'clock spring' shown at 148 that may be made from wire that is generally flat in cross-section. The wire may be coiled in a spiral shape, as can be seen in FIG. 11a. The spring 148 may have a first (inner end) 150 that has a tang 152 that engages a slot in a post 154 extending from the second tensioner arm 103 axially along the first pivot axis 104, and a second (outer end) 156 that has a hook 158 that is positioned to engage the first tensioner arm 102. As a result of using a clock spring 148 as the tensioner spring, the height of the tensioner 100 (i.e. the distance that it extends outwardly from the stationary member to which it is mounted) may be less than the height of the tensioner shown in FIG. 8 which uses a cylindrically coiled tensioner spring 126. It will be noted however that, while a clock spring 148 can provide the same length of spring as a cylindrically coiled spring while maintaining a lower profile, it comes at the cost of having a larger diameter. This may be an acceptable result, however, depending on the layout of the components of the tensioner 100 and of other components in and around the vehicle engine. An example of the use of a clock spring in a tensioner (albeit a tensioner that is configured differently than the one depicted in FIG. 11a), is shown in U.S. Pat. Nos. 4,504,254 and 4,902,267, both of which are incorporated herein in their entirety.

Figure 11B:
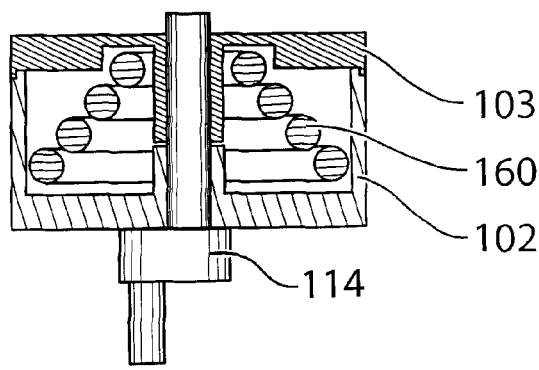

In an embodiment shown in FIG. 11b, the tensioner spring is a conically coiled spring 160. The conically coiled spring 160 provides some reduction in height as compared to the cylindrically coiled spring 126 while also having a smaller overall diameter than the clock spring 148.

Figure 11C:
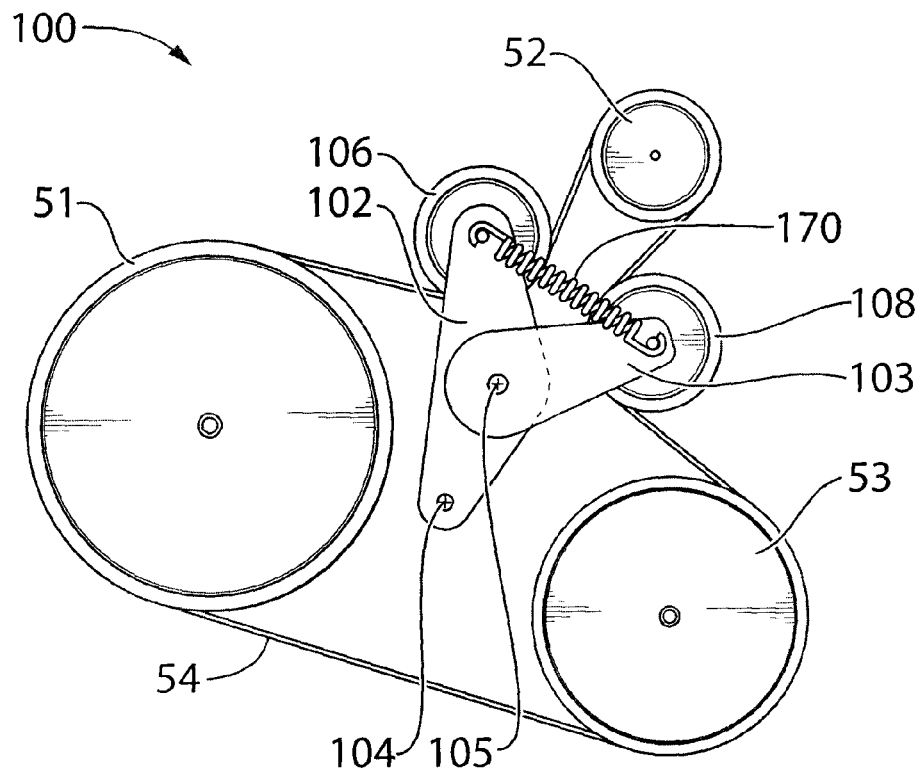
Figure 11D:
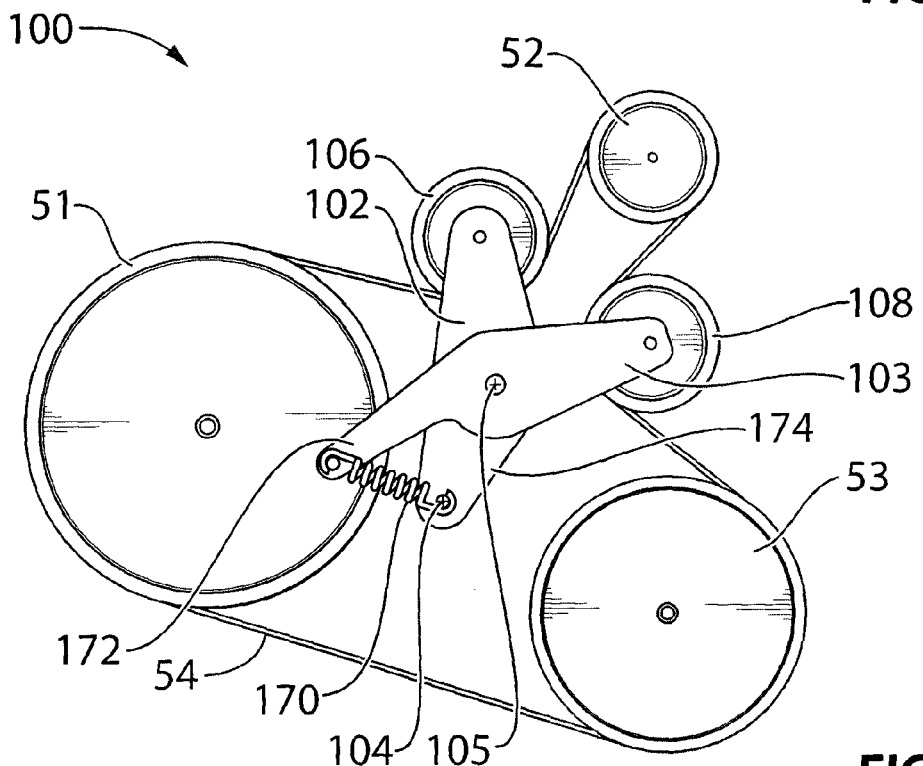
Figure 11E:
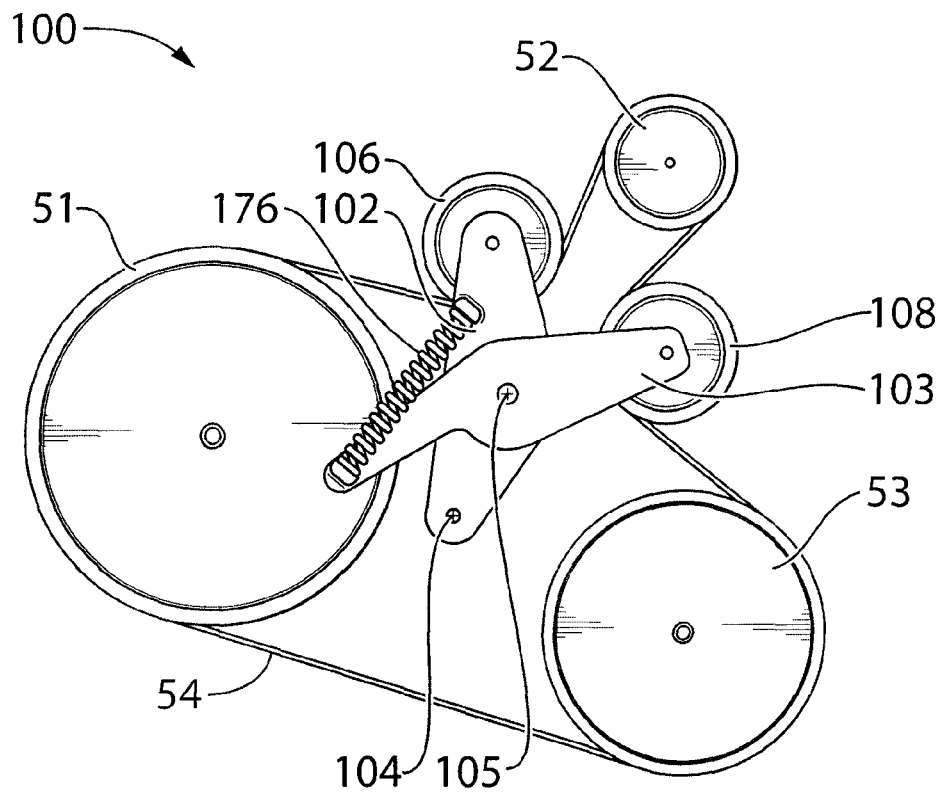
Figure 11F:
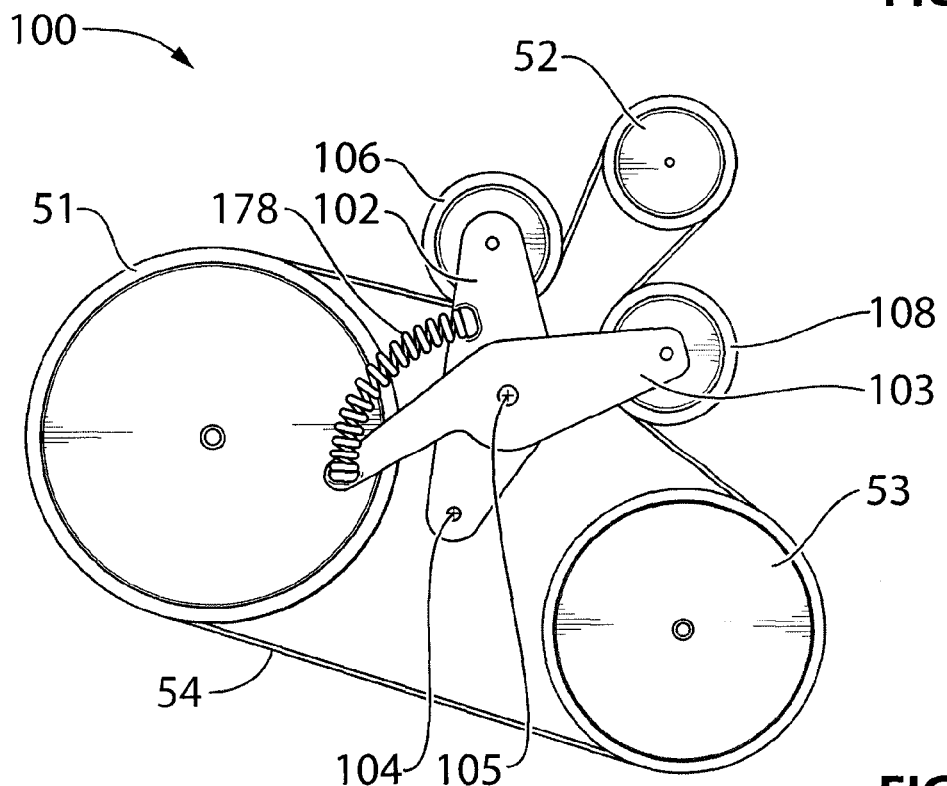

As shown in FIG. 11c, the tensioner spring may be a linear tension spring 170 that extends between the arms 102 and 103 proximate the rotation axes 107 and 109. The tensioner spring 170 is in tension and thus pulls the arms 102 and 103 towards each other, which urges the pulleys 106 and 108 towards each other. As shown in FIG. 11d, the tensioner spring may be a linear tension spring 170 that extends between an opposing portion 172 of the second tensioner arm 103 and a portion 174 of the first tensioner arm 102 proximate the first arm pivot axis 104. The spring 170 is in tension and thus pulls the arms 102 and 103 towards each other, which urges the pulleys 106 and 108 towards each other. In an embodiment shown in FIG. 11e, the tensioner spring is a compression spring 176 that extends between the first and second arms 102 and 103 and urges them apart, which urges the first and second pulleys 106 and 108 towards each other. In an embodiment shown in FIG. 11f, the tensioner spring may be an arcuate compression spring 178 that extends between the tensioner arms 102 and 103 and urges them apart so as to urge the pulleys 106 and 108 towards each other.

Figure 11G:
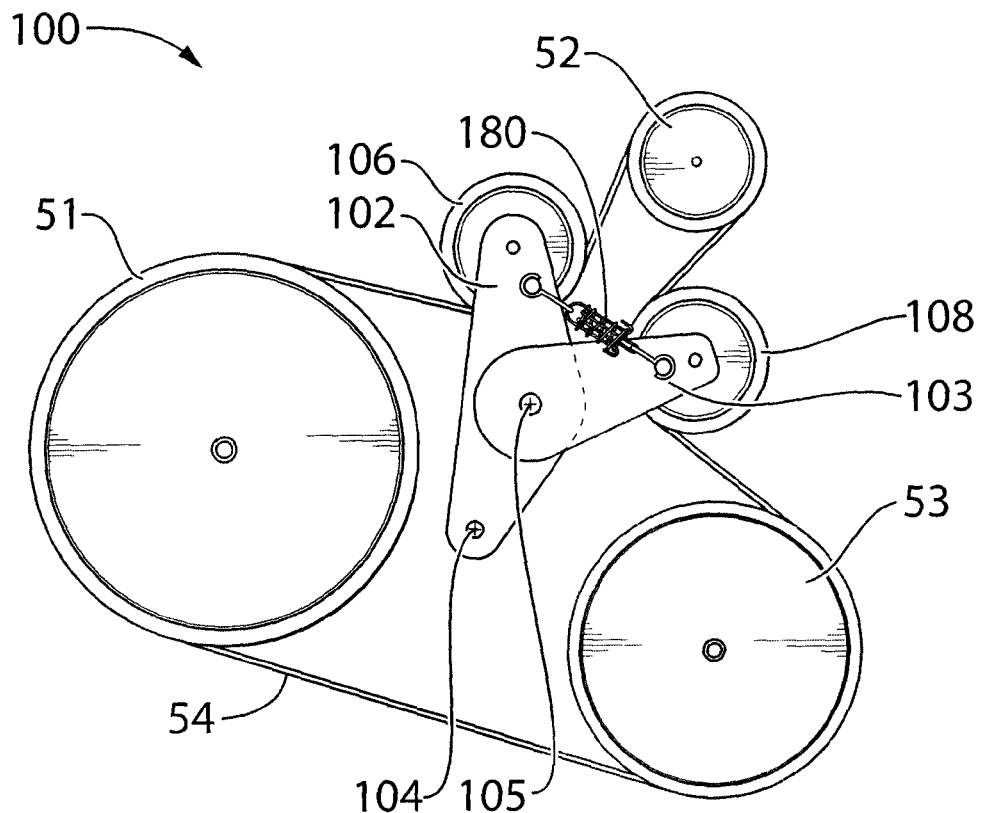
Figure 11H:
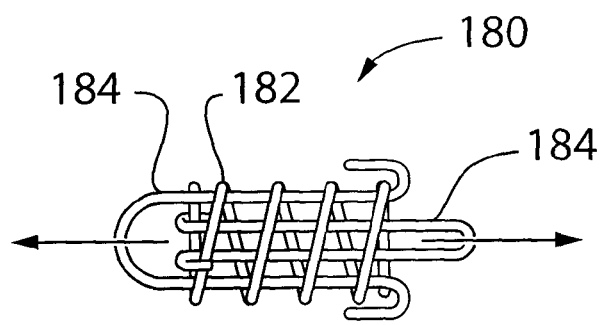

Referring to FIGS. 11g and 11h, the tensioner spring may be in the form of a drawbar spring 180 which includes a compression spring 182 and first and second harnesses 184, which may also be referred to as drawbars 184 that extend between respective ends of the spring 182 and the first and second arms 102 and 103. The harnesses 184 permit the compression spring 182 to pull the first and second arms 102 and 103 towards each other. Thus, the effect of a tension spring is provided but without the need for special tangs at the ends of the spring 182, which are typically needed on tension springs. Such tangs represent potential failure points in conventional tension springs.

Figure 11I:
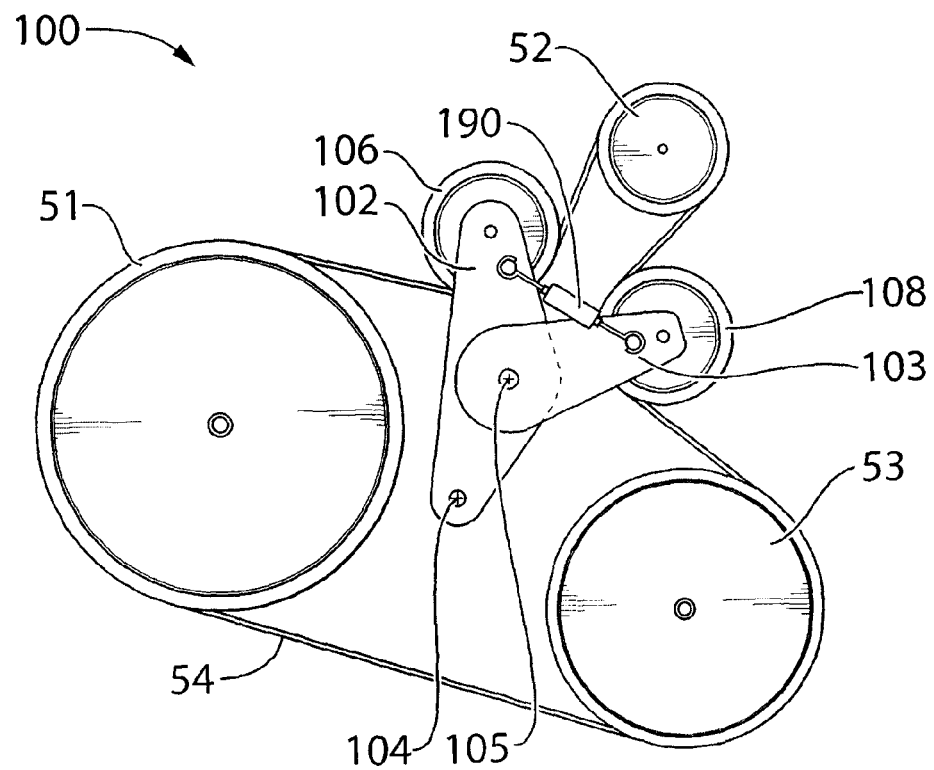
Figure 11J:
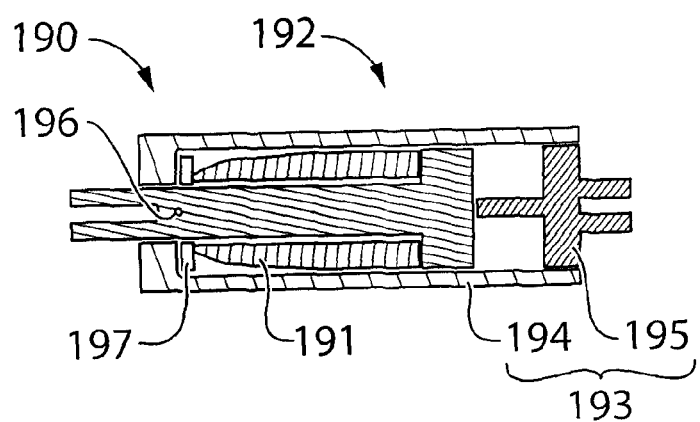

Referring to FIGS. 11i and 11j the tensioner spring may be in the form of a closed cell foam spring assembly 190. The closed cell foam spring assembly 190 includes a closed cell foam spring 191 and a draw cartridge 192 that includes a housing 193 formed from a draw tube 194 and an end member 195 fixedly connected to the draw tube 194 (e.g. by press-fit), a draw pin 196, and a spacer washer 197. By pulling on the draw pin 196 and by pulling on the end member 195 the housing assembly 192 acts on the closed cell foam spring 191 in a similar way to the harnesses 184 in the assembly shown in FIGS. 11g and 11h, so that the closed cell foam spring 191 is in compression while the assembly 190 is in tension and pulls the first and second arms 102 and 103 towards each other.

The closed cell foam spring 191 may have any suitable variation in properties along its length (i.e. variation in cross-sectional area, shape, density and other physical properties) to provide any desired spring force/compression relationship. As an example, it may be configured so provide a spring rate that is approximately constant throughout a selected range of compression. In another example it may be configured to provide a spring force that compensates for changes in the geometric relationship between the tensioner arm and the belt 54, so that a substantially constant tensioning force is applied to the belt 54 even as the belt 54 stretches and thus lengthens as it ages. Aside from being able to tailor the spring force/compression relationship, the closed cell foam spring 191 is advantageous in that it can in some embodiments be capable of a large amount of compression relative to its rest length. For example, in some embodiments, the amount of compression available may be as much as 80% of its rest length (i.e. the closed cell foam spring may be capable of being compressed to a length that is 20% of its rest length).

While the tensioner springs have been described in relation to the tensioner 100, any of these tensioner springs may be incorporated for use with the tensioner 1 in place of the tensioner spring 38. An example of a tensioner that includes a suitable tensioner spring that is an arcuate helically wound spring is shown in PCT publication WO2007/025374A1.

Use of Tensioner Spring on First Tensioner Arm

Figure 12:
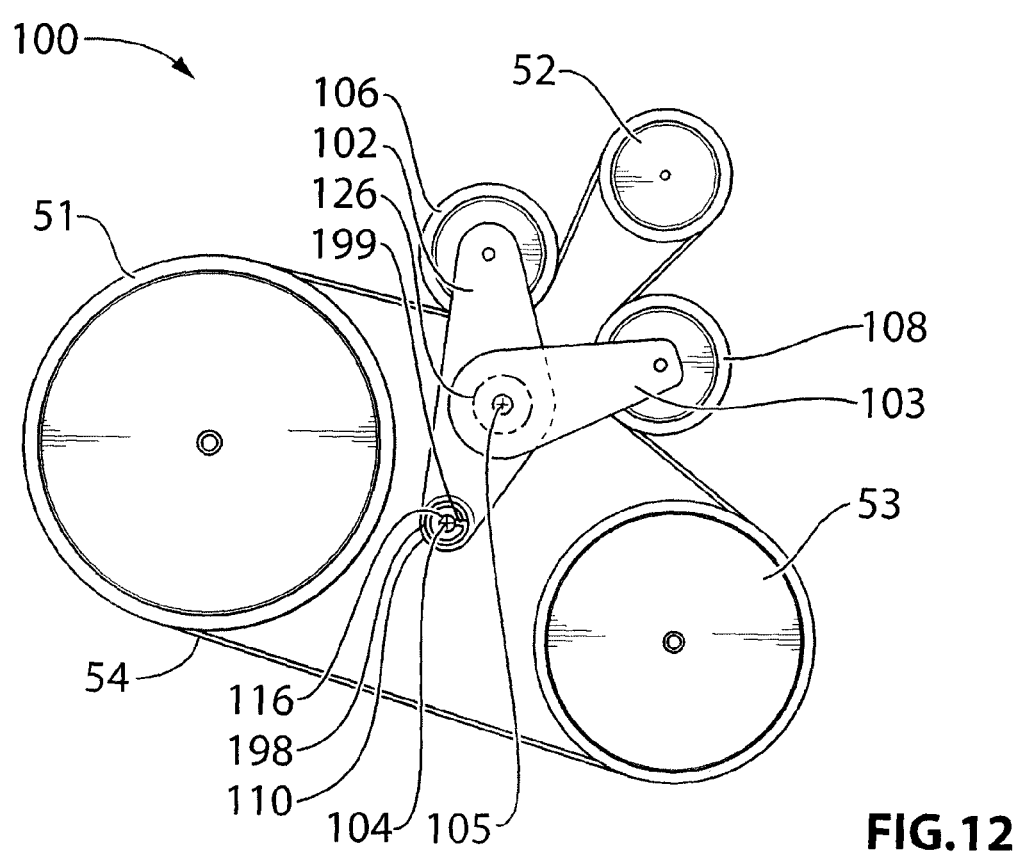
FIG. 12 is a plan view of the tensioner shown in FIG. 8 but with a biasing member for each of two tensioner arms.

As shown in FIG. 12, the tensioner 100 may include a first tensioner spring 198 that acts between the first tensioner arm 102 and the base 110. The tensioner spring 198 may be any of the tensioner springs shown in FIGS. 11a-11j. The tensioner spring 198 may, for example, be a helically coiled torsion spring that is positioned in a chamber within the base 110 surrounding the first shaft 116 and that has a first end (not shown) engaged with the base 110 and a second end 199 that is engaged with the first shaft 116.

The tensioner spring 198 may be used to urge the first tensioner arm 102 in a direction towards engagement with the belt 54. Thus, in the view shown in FIG. 12, the tensioner spring 198 may urge the first tensioner arm 102 in a clockwise direction, while the tensioner spring 126 shown in FIG. 12 may urge the second tensioner arm 103 in a counterclockwise direction.

In other embodiments the tensioner spring 198 may be configured to urge the first tensioner arm 102 towards a neutral position that may, for example, be the position of the tensioner arm 102 shown in FIG. 12. In such an embodiment, as the tensioner arm 102 moves clockwise away from the neutral position, the tensioner spring 198 uncoils and applies a spring force on the arm 102 urging the arm 102 towards the neutral position. As the tensioner arm 102 moves counterclockwise away from the neutral position, the tensioner spring 198 coils more tightly and applies a spring force on the arm 102 urging the arm 102 towards the neutral position.

Damping Structures

Figure 13A:
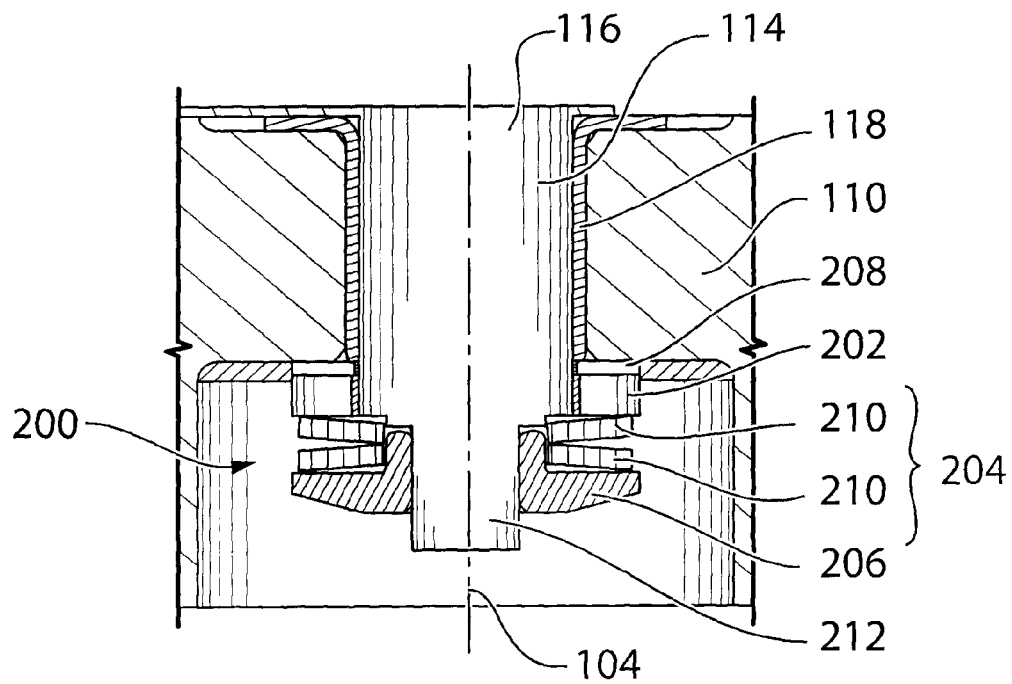
FIGS. 13a-13d are sectional elevation views showing optional damping structures for damping a first tensioner arm of the tensioner shown in FIG. 8.

It is possible for the tensioner 100 to have no damping structure incorporated in it. Optionally however, a damping structure may be provided, for damping the motions of the first and second tensioner arms 102 and 103. Reference is made to FIGS. 13a-13d which show several types of damping structures that may be incorporated into the tensioner 100. For example, damping structures may be provided that apply a substantially constant damping force even as parts wear over time, that apply a damping force that varies based on tensioner arm position, that apply a damping force that varies based on the angular speed of the tensioner arm 102 or 103 as it pivots, or that apply a damping force that varies based on the direction of movement of the tensioner arm 102 or 103. An example of a damping structure that compensates for wear in the damping mechanism parts is shown at 200 in FIG. 13a. The damping structure 200 includes a first friction member 202, a damping biasing structure 204 and a second friction member 208. The second friction member 208 is used to provide a damping surface on the base 110 that is frictionally engaged by the first friction member 202. The materials of the second friction member 208 and the first friction member 202, and the surface finishes on the mutually engaging surfaces of those two components are selected to provide a selected coefficient of friction therebetween. For example, the second friction member 208 may be made from steel or some other non-metallic material, and may be coated with a layer of PTFE or the like. The first friction member 202 may be made from any suitable material such as, for example, a suitable steel with a suitable high quality surface finish. The first friction member 202, as shown in FIG. 13a, may be in the form of a thrust washer that is slidable axially on the first shaft 116 of the shaft member 114, but that is fixed rotationally with the first shaft.

The damping biasing structure 204 urges the first friction member 202 into engagement with the friction member 208. The damping biasing structure 204 may have any suitable structure. For example, it may include first and second conical washers 210. A retaining member 206 provides a bearing surface that is axially fixed relative to the shaft member 118 to support the conical washers 210 as they urge the first friction member 202 into engagement with the second friction member 208. The retaining member 206 may be fixedly mounted onto an end portion 212 of the first shaft 116, e.g. by press-fit.

The damping structure 200 is provided for damping rotation of the first tensioner arm 102 about the first pivot axis 104. As the belt tension changes in the segments 55 and 56 (FIG. 10) both the second tensioner arm 103 will pivot relative to the first tensioner arm 102 and the first tensioner arm 102 will pivot relative to the vehicle engine as the tensioner arms 102 and 103 settle in a new equilibrium position. Providing damping structure 200 for either of the arms 102 or 103 assists in damping the movement of the tensioner 100 during changes in belt tension particularly in situations where torsional vibrations (also referred to as 'torsionals') exist.

As the second friction member 208 and/or the first friction member 202 wear down, the conical washers 210 continue to urge the first friction member 202 into engagement with the second friction member 208. The change in the axial length of the conical washers 210 that occurs as one or both of the friction members 202 and 208 wear down is relatively small, and as a result, the spring force exerted by the conical washers 210 on the first friction member 202 is approximately constant. As a result, the friction force, and therefore the damping force, between the friction members 202 and 208 is approximately constant. Thus, the damping structure 200 can compensate for wear in the first and second friction members 202 and 208 while still maintaining a generally constant damping force.

Figure 13B:
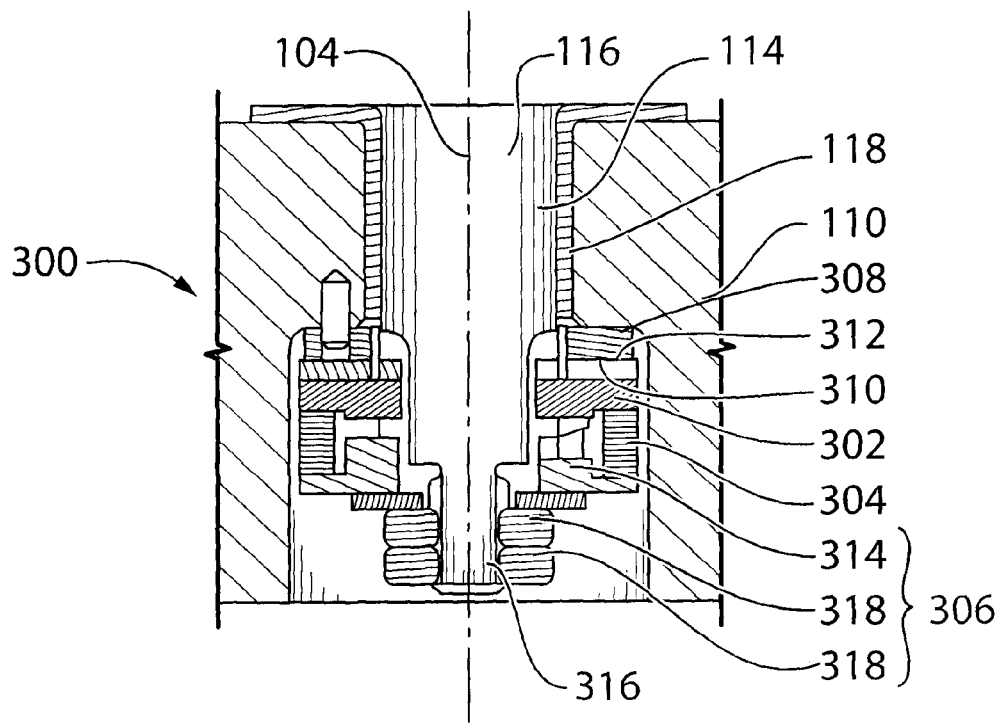

An example of a damping structure that applies a damping force that varies with tensioner arm position is shown at 300 in FIG. 13b. The damping structure 300 may include a first friction member 302, a damping member biasing structure 304 and a second friction member 308. The second friction member 308 is fixed to the base 110, and the first friction member 302 is fixed rotationally to the first tensioner arm 102 but is axially slidable relative to it. This mounting may be provided by inwardly extending ribs on the damping member that engage axial slots on the first shaft 116 of the shaft member 114.

The second friction member 308 and the first friction member 302 have helical ramp surfaces 310 and 312 respectively and frictionally engage each other along those ramp surfaces 310 and 312 respectively. These ramp surfaces 310 and 312 are described further below. The helical ramp surfaces 310 and 312 may have any suitable helix angle, and may have a helix angle that changes. End stops may optionally be provided to limit the amount of pivotal movement that is available.

The biasing member 304 may be any suitable biasing member that can urge the friction members 302 and 308 towards engagement along the ramp surfaces 310 and 312. For example, the biasing member 304 may be a hollow cylindrical closed cell foam spring or a helical coil compression spring. A retaining member 306 may be fixedly connected to the first shaft 116 and supports the biasing member 304 as it urges the first friction member 302 into engagement with the second friction member 308. The retaining structure 306 may include a support member 314 that is mounted (e.g. via threaded connection) to an end portion 316 of the first shaft 116, and a pair of lock nuts 318 that are threadedly mounted to the end portion 316 behind the support member 314.

As the first and second tensioner arms 102 and 103 pivot in response to a change in the belt tension, the pivoting of the first tensioner arm 102 relative to the base 110 drives the first friction member 302 rotationally relative to the second friction member 308. The engagement of the helical ramp surfaces 310 and 312 drives the first friction member 302 axially, (downwards or upwards in the view shown in FIG. 13b), when the first friction member 302 rotates relative to second friction member 308. The axial movement of the first friction member 302 changes the length of the biasing member 304, which in turn changes the biasing force exerted by the biasing member 304 on the first friction member 302. This change in biasing force in turn causes a change in the friction force and therefore the damping force between the first friction member 302 and the second friction member 308. The damping structure 300 can be configured so that an increase in belt tension in belt segment 56 (FIG. 10) would cause an increase in the damping force between the first tensioner arm 102 and the base 110. Alternatively, the damping structure 300 can be configured so that an increase in belt tension in belt segment 55 (FIG. 10) would cause an increase in the damping force between the first tensioner arm 102 and the base 110. Thus the damping structure 300 can be configured to provide a damping force that varies in response to the pivot angle of the first tensioner arm 102.

Figure 13C:
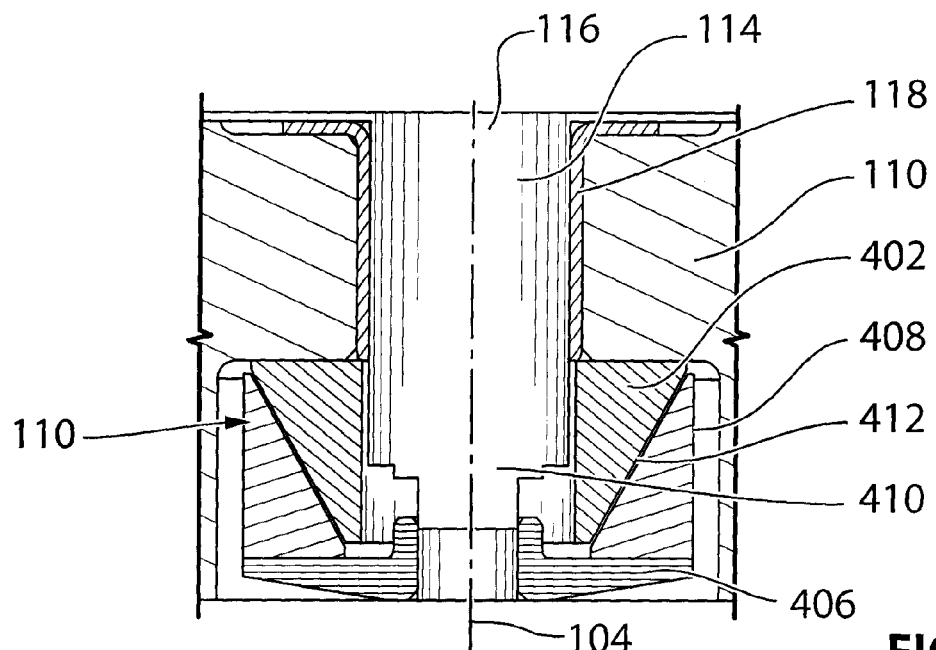

An example of a damping structure that applies a damping force that varies with the angular speed of the tensioner arm 102 or 103 is shown at 400 in FIG. 13c. The damping structure 400 may be configured to vary the damping force based on the speed of pivoting of the first tensioner arm 102. The damping structure 400 may include a first friction member 402 and a second friction member 408. The second friction member 408 may be rotationally fixed to the base 110 (via radially outwardly extending ribs on the second friction member 408 and axial slots in the base 110). The ribs and slots permit the second friction member 408 to be slidable relative to the base 110. The first friction member 402 is fixedly mounted (or at least fixed rotationally) to the first shaft 116 of the shaft member 114. A retaining structure 406 may be in the form of a retainer member that is press-fit on to an end portion 410 of the first shaft 116 to a position wherein there is a small conical gap between the second friction member 408 and the first friction member 402. A lubricant 412 is provided in the gap. The lubricant 412 has thixotropic properties such that its viscosity increases as the relative velocity between the friction members 402 and 408 increases and decreases as the relative velocity decreases. As a result, when the first tensioner arm 102 pivots quickly relative to the base 110 the damping force on the first tensioner arm 102 will be higher, and as it pivots more slowly, the damping force will be lower.

While the friction members 402 and 408 are shown as having generally frusto-conical shapes on their working surfaces, it will be noted that they could alternatively have generally cylindrical working surfaces instead, such that a suitably small gap is still provided therebetween for the lubricant 412. Alternatively, the friction members 402 and 408 may be generally planar (e.g. annular discs) that are spaced apart by a selected gap with lubricant in the gap. In such an embodiment, there could be a plurality of annular disc-shaped first friction members 402 that are connected to the first shaft 116 and which are interleaved with a plurality of annular disc-shaped second friction members 408 that are connected to the base 110 such that gaps with lubricant are provided between each first friction member 402 and each adjacent second friction member 408.

The three damping structures shown in FIGS. 13*a*-13*c* may be configured to provide 'symmetrical' damping, which means that the damping force is substantially the same regardless of the direction of pivoting of the first tensioner arm 102. Alternatively, any of the three damping structures shown in FIGS. 13*a*-13*c* may be configured to provide 'asymmetrical' damping, wherein the damping force differs depending which direction the first tensioner arm 102 is pivoting in. To provide such asymmetrical damping, the surface of the first friction member 202, 302 or 402, and/or the surface of the friction member 208, 308 or 408 may be textured in such a way as to provide a relatively higher coefficient of friction under pivoting of the first tensioner arm 102 in a first direction and a relatively lower coefficient of friction under pivoting of the first tensioner arm 102 in a second, opposite direction.

Figure 13D:
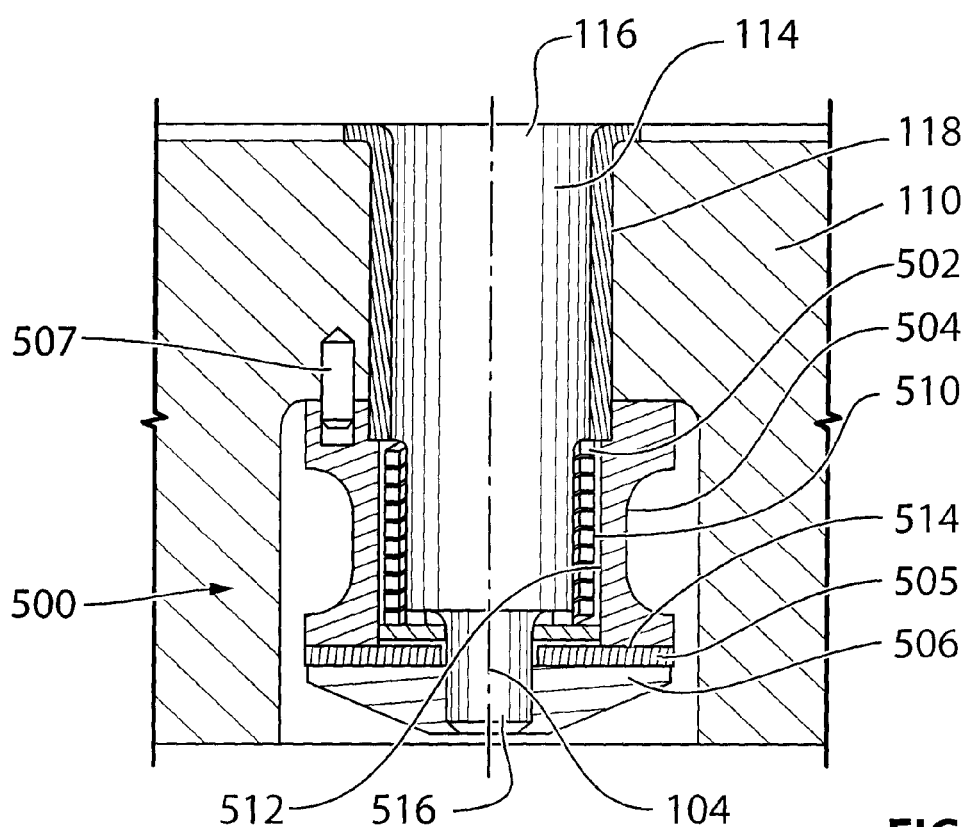

An alternative damping structure that provides asymmetrical damping is shown at 500 in FIG. 13*d*. The damping structure 500 permits a large amount of variation in the damping force for resisting movement of the tensioner arm 102 when pivoting in one pivot direction versus the damping force resisting movement of the tensioner arm 102 when pivoting in the opposite pivot direction. The damping structure 500 may include a one-way clutch member, such as a wrap spring clutch spring 502 and a bushing 504. The bushing 504 may be fixedly mounted to the base 110 (e.g. via dowel pin 507) and is fixedly connected to one of the helical ends of the wrap spring clutch spring 502 (which may simply be referred to as a wrap spring). The second helical end of the wrap spring 502 may be free (i.e. not fixedly connected to anything), but may be frictionally engaged with the first shaft 116. As the first shaft 116 pivots in a first direction it frictionally pushes on the free second end of the wrap spring 502, urging the wrap spring 502 to uncoil. In the first direction, the damping force is provided at least in part by the frictional engagement of the first shaft 116 with the second end of the wrap spring 502. Whatever frictional force exists between the shaft member 116 and the coils of the wrap spring 502 while being urged to uncoil also contributes to the damping force.

As the first shaft 116 pivots in a second direction (i.e. in the opposite direction to the first direction), the frictional engagement between the first shaft 116 and the second end of the wrap spring 502 pulls the second end of the wrap spring 502 which causes the wrap spring 502 to coil more tightly. This, in turn, causes a (potentially large) increase in the frictional force between the wrap spring 502 and the first shaft 116, which results in a high damping force for resisting the movement of the first tensioner arm 102 in the second direction. Care may be taken to ensure that the damping force acting on the first tensioner arm 102 during pivoting in the second direction does not cause the first tensioner arm 102 to lock up during such pivoting.

Aside from the damping forces described above a frictional force may also be provided between a thrust bearing 505 and an axial end face 514 of the bushing 504. This frictional force would contribute to the damping force during pivoting of the first tensioner arm 102 in both rotational directions. The thrust bearing 505 is urged into engagement with the bushing 504 by a retaining structure 506 which is fixedly mounted to an end portion 516 of the first shaft 116.

Based on the above description, the wrap spring 502 may constitute a first friction member, and the shaft 116 may constitute a second friction member. Additionally, the thrust bearing 505 and the bushing 504 may also constitute first and second friction members respectively.

It will be noted that in some embodiments, the damping structures shown in FIGS. 13*a*-13*d* may be combined with each other to form a multi-function damping structure. For example, the damping structure 400 may be combined with the damping structure 200 so that there is a constant damping force that does not vary as the parts wear and an additional damping force that increases with velocity.

The damping structures shown in FIGS. 13*a*-13*d* have been described as being in relation to damping the pivoting of the first tensioner arm 102. It will be understood that any of these damping structures (or any other suitable damping structure) may be used to dampen the movement of the second tensioner arm 103 relative to the first tensioner arm 102.

Other damping structures may be provided instead of, or in addition to, the damping structures shown herein.

While the damping structures have been shown and described in relation to the tensioner 100, any of these damping structures may be incorporated for use with the tensioner 1, more specifically for damping the movement of first tensioner arm 102 about its pivot axis.

Figure 14:
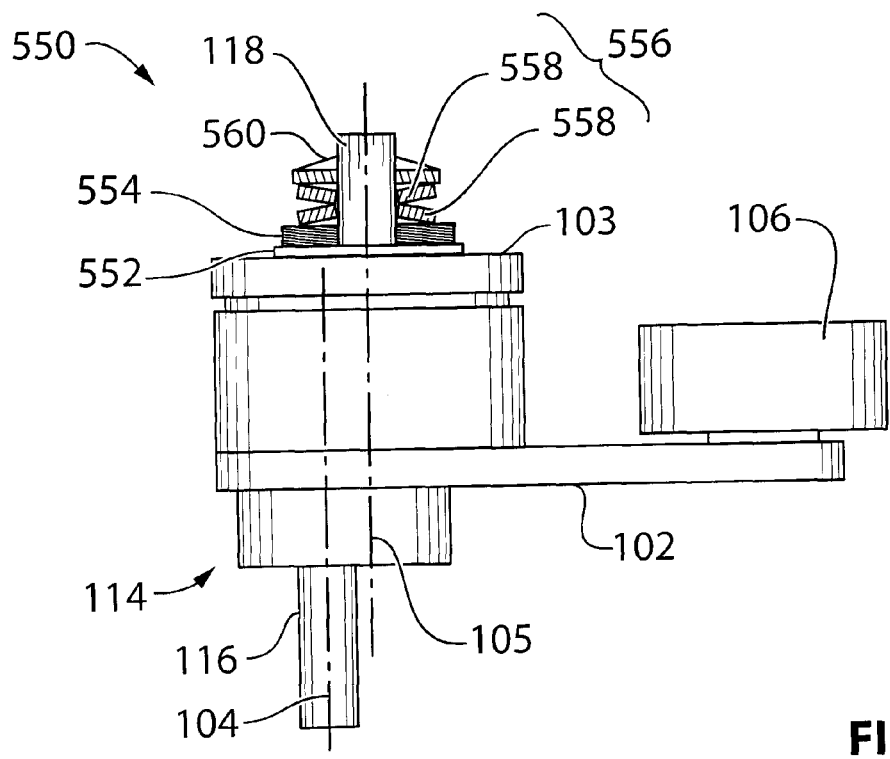
FIG. 14 is an elevation view showing an optional damping structure for damping a second tensioner arm of the tensioner shown in FIG. 8.

FIGS. 13*a*-*d* show damping structures for the first tensioner arm 102. It will be noted that any of these damping structures could alternatively or additionally be damping the movement of the second tensioner arm 103. For example, as shown in FIG. 14, a damping structure 550 that is similar to the damping structure 200 is provided between the first and second tensioner arms 102 and 103 so as to dampen the movement of the second tensioner arm 103. The damping structure 550 includes a first friction member 552 and a second friction member 554 which may be similar to the first and second friction members 202 and 208 in FIG. 13*a*. The first friction member 552 is rotationally fixed to the second tensioner arm 103, e.g. by a rib and slot engagement between them. The second friction member 554 may be rotationally fixed to the first tensioner arm 102 by any suitable means, such as by a rib and slot engagement between the second friction member 554 and the second shaft 118. A damping biasing structure 556 that may include first and second conical washers 558 is held in compression by a retainer member 560 (which may be threaded connected to the second shaft 118). The compressed washers 558 urge the first and second friction members 552 and 554 into engagement with each other with a selected force, which provides a damping force resisting the movement of the second tensioner arm 103 relative to the first tensioner arm 102.

Any other suitable damping structure may additionally or alternatively be provided between the first and second tensioner arms 102 and 103. Suitable damping structures are shown in U.S. Pat. Nos. 4,473,362, 4,698,049, 6,164,091, 7,273,432 and 8,142,315, US patent publication no. 2008/0280713, PCT publication Nos. WO2006099731 and WO2007025374, and German Patent No. 1952 4403C2, the contents of all of which are incorporated herein by reference in their entirety.

Short Offset Distance Between Pivot Axis of First Tensioner Arm and Pivot Axis of Second Tensioner Arm The distance between the second pivot axis 105 from the first pivot axis 104 may be any selected distance. In the embodiment shown in FIG. 8, the distance between the first and second pivot axes 104 and 105 may be less than a quarter of the distance between the second pivot axis 105 and either the first pulley rotation axis 107 or the second pulley rotation axis 109. In the particular embodiment shown in FIG. 8, the distance may be sufficiently short that there is radial overlap between the first and second shafts 116 and 118. In other words, the offset distance between the axes 104 and 105 may be less than the radius of the larger of the two shafts 116 and 118. 'Larger' in this instance is in reference to the radii of the two shafts. The radius of the first shaft 116 is shown at R1 in FIG. 8, the diameter of the second shaft 118 is shown at R2, and the offset distance between the axes 104 and 105 is shown as D12. In an embodiment wherein a torsion spring 126 is used as the tensioner spring, a hub portion 127 is optionally part of the first tensioner arm 102 and which defines a spring chamber 129 in which the torsion spring 126 is positioned. In such an embodiment, the offset distance D12 between the axes 104 and 105 may optionally be less than the radius, shown in FIG. 8 at RH, of the hub portion 127.

The tensioner 100 shown in FIG. 8 is advantageous in that it permits the tensioner 100 to be relatively compact (and therefore relatively light), as compared to a tensioner in which the distance between the first and second pivot axes 104 and 105 (also referred to as the offset distance) is at least a quarter of the distance between the second pivot axis 105 and both the first and second pulley rotation axes 107 and 109. The tensioner 100 may thus be usable on relatively smaller engines than some tensioners of the prior art. Additionally, by providing the tensioner 100, the swing distance traveled by the first tensioner arm 102 during pivoting movement may be smaller than the swing distance traveled by a tensioner which has an offset distance that is larger than a quarter of the distance between the second pivot axis and both the first and second pulley axes.

Arrangements of Tensioner Arms Relative to Each Other

Figure 15:
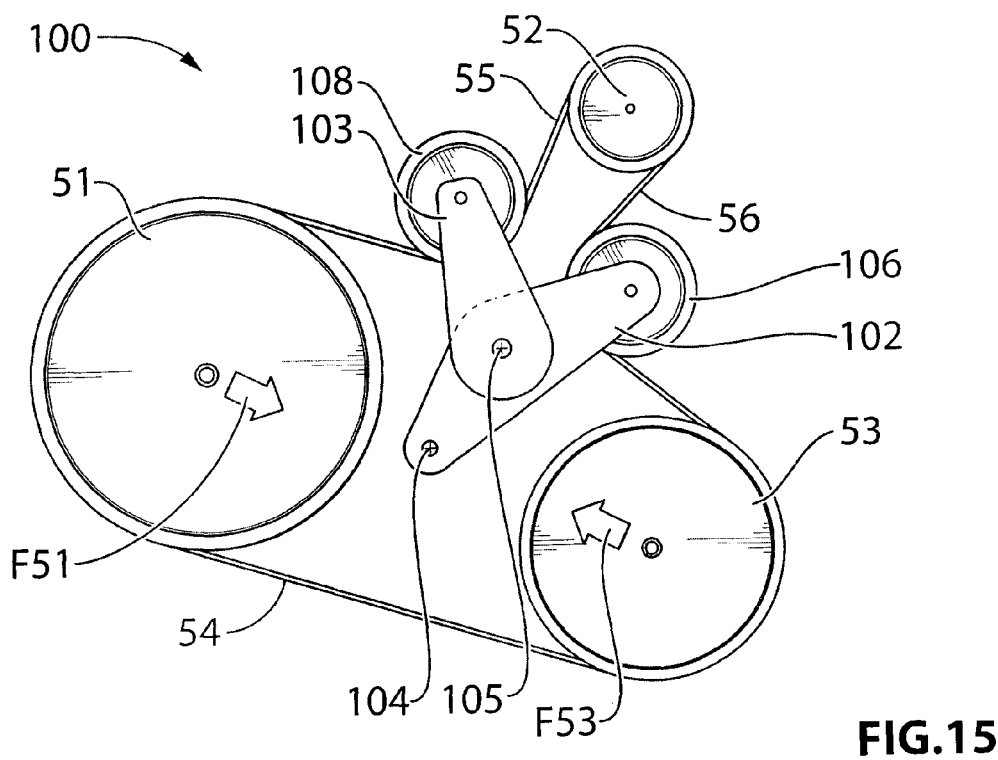
FIG. 15 is a plan view showing a variant of the tensioner shown in FIG. 8.

In the embodiment shown in FIG. 10, the first arm 102 (i.e. the primary arm) and the second arm 103 (i.e. the secondary arm) are arranged such that the pulley 106 on the primary arm 102 leads the pulley 108 on the secondary arm 103 in the counterclockwise direction about first pivot axis 104. As a result, the tensioner 100 shown in FIG. 10 may be referred to as having a counterclockwise leading configuration. Reference is made to FIG. 15, which shows the tensioner 100 in which the primary arm 102 leads the secondary arm 103 in the clockwise direction and thus the tensioner 100 in FIG. 15 may be said to have a clockwise leading configuration. The designation of the tensioner 100 as being clockwise leading or counterclockwise leading may be irrespective of the direction of movement of the belt 54. For example, the belt 54 may move in a clockwise direction along its path in the view shown in both FIGS. 10 and 15. For greater clarity, the terms clockwise leading and counterclockwise leading as used herein are made from the perspective of someone looking at the tensioner 100 from outside of the engine, as opposed to looking at the tensioner 100 from within the engine.

Limits for Range of Movement of First and/or Second Tensioner Arms

Figure 16:
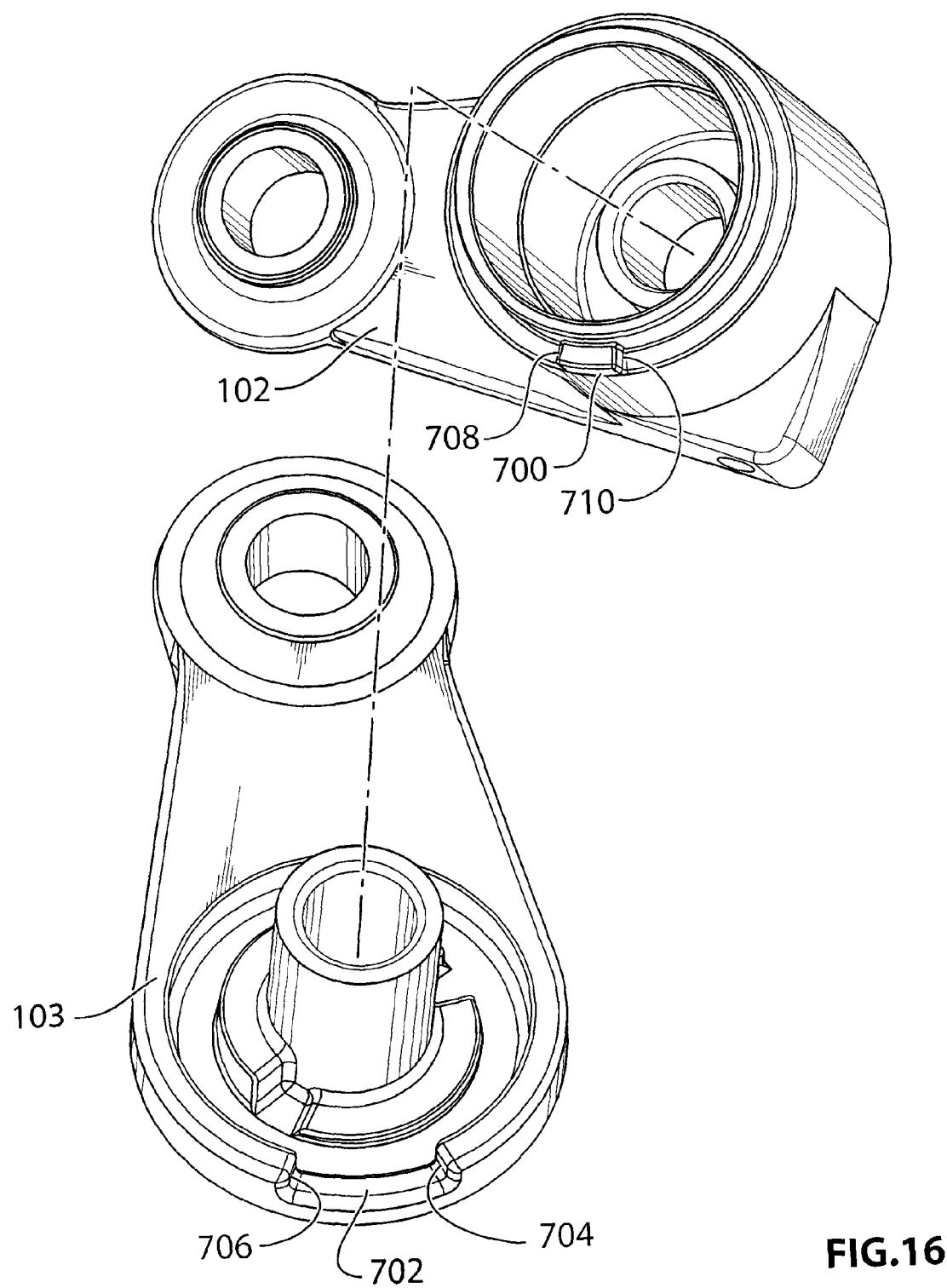
FIG. 16 is an exploded perspective view showing a limit structure for limiting the range of travel of a first tensioner arm of the tensioner shown in FIG. 8.

Limit structures that may be provided for limiting the range of movement of the first tensioner arm 102 relative to the engine block 99 and for limiting the range of movement of the second tensioner arm 103 relative to the first tensioner arm 102. The limit structures may be provided any suitable way. For example, as shown in FIG. 16, a limit structure is provided in the form of a projection 700 on the first tensioner arm 102 that extends into a slot 702 in the second tensioner arm 103. The projection 700 has first limit surfaces 704 and 706 thereon which engage second limit surfaces 708 and 710 respectively, which are at the ends of the slot 702.

Figure 17:
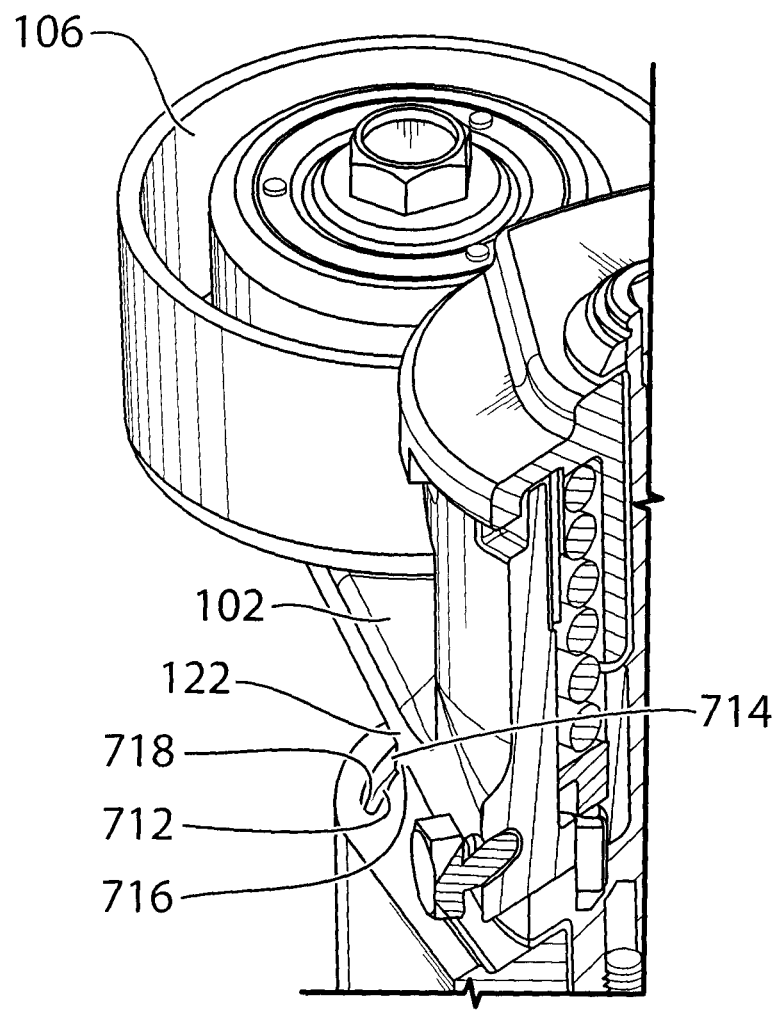
FIG. 17 is an exploded perspective view showing a limit structure for limiting the range of travel of a second tensioner arm of the tension shown in FIG. 8.

Referring to FIG. 17, a limit structure between the first tensioner arm 102 and the base 110 (which is fixedly mountable to the engine block 99 via element 112 shown in FIG. 9*a*) is formed by a projection 712 on the first tensioner arm 102 that engages a slot 714 on the base 110. First limit surfaces 716 on the ends of the projection 712 (only one surface 716 is shown in FIG. 17 as the other surface 716 is obscured in the view shown) are engageable with second limit surfaces 718 at the ends of the slot 714 to limit the range of movement of the first tensioner arm 102 relative to the base 110 and therefore relative to the engine block 99 (only one surface 718 is shown in FIG. 17 as the other surface 718 is obscured in the view shown). While limit surfaces are shown for limiting both ends of the angular range of movement of the first tensioner arm 102 and both ends of the angular range of movement of the second tensioner arm 103, it will be understood that a single first limit surface and a single second limit surface may be provided instead, so as to provide a limit only one end of the range of movement of the first or second tensioner arm 102 or 103.

While the limit structures may be provided in the form of projections in slots as shown in FIGS. 16 and 17, other types of limit structure could alternatively be provided, such as, for example, by way of a wrap spring clutch that permits a selected amount of rotation before it coils or uncoils from a rest position to a working position whereat it engages an engagement surface that prevents further movement of whichever tensioner arm it is associated with. For example, it may lock the first tensioner arm 102 to the base 110, preventing further movement of the first tensioner arm 102 in a selected direction. If the first tensioner arm 102 is urged in the opposite direction, back from the position at which the clutch engaged, then the clutch can disengage thereby permitting movement of the first tensioner arm 102 in the opposite direction. Thus, in this example, the wrap spring clutch and the engagement surface which it engages together make up a limit structure that limits the range of movement of the first tensioner arm 102 (in one direction).

As yet another alternative, a variable damping structure can be provided on one or both of the tensioner arms 102 and 103, that provides a damping force that varies with the position of whichever of the tensioner arm 102 or 103 it is associated with. The variable damping structure may be configured so that the damping force increases to a point where it prevents the belt tension from moving the tensioner arm 102 and/or 103.

As yet another alternative, a ball detent or a pin can be positioned at a selected position to abut the tensioner arm 102 and/or 103 to limit its range of movement. Alternatively any other suitable structure can be provided.

Additional Idler Pulleys on First and Second Tensioner Arms

Figure 18:
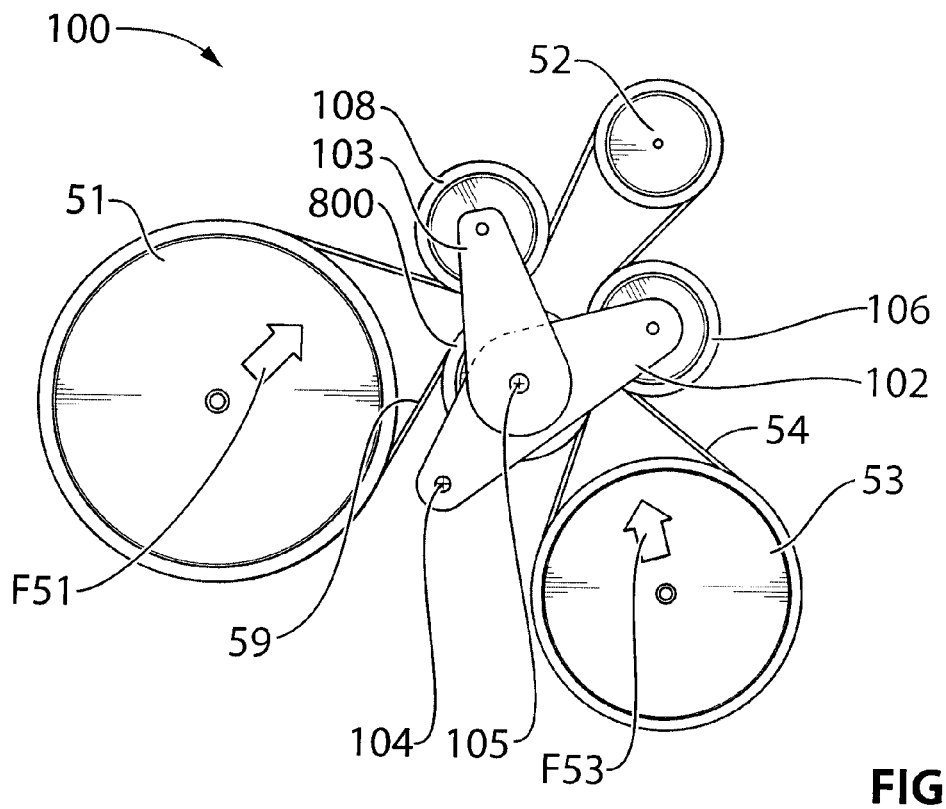
FIGS. 18-20 are plan views of alternative positions for an idler pulley that can be provided with the tensioner shown in FIG. 8.
Figure 19:
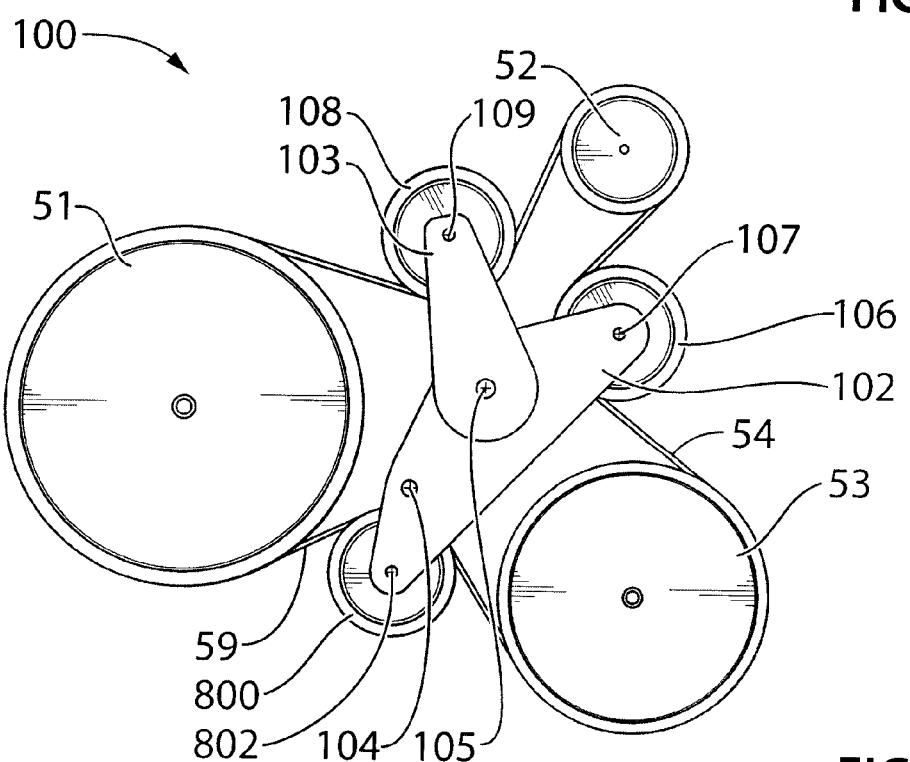

In addition to providing first and second tensioner arms 102 and 103 with pulleys 106 and 108 thereon respectively, the tensioner 100 may further include one or more additionally idler pulleys thereon. An example is shown in FIG. 18 wherein an idler pulley 800 is shown mounted to the first tensioner arm 102 for rotation about the second tensioner arm pivot axis 105, and in engagement with a third segment 59 of the belt 54. The idler pulley 800 may have a number of effects on the accessory drive belt 54 with which it is engaged. For example, the idler pulley 800 increases the amount of belt wrap that exists about the crankshaft pulley 51. In general, adding a pulley introduces additional bends into a belt as the belt travels about an accessory drive system. Additionally, the added pulley represents an additional source of bearing friction. Both of these effects can cause an increase in the power consumption (i.e. parasitic losses) associated with the accessory drive system. However, by increasing the amount of belt wrap about the crankshaft pulley 51 the belt tension in the belt can be reduced without increasing the likelihood of belt slip with the crankshaft pulley, which reduces the amount of energy required to drive the accessory drive system. In some embodiments, the energy savings provided by the reduction in belt tension more than compensates for any increase in energy consumption associated with the additional bearing friction and bending of the belt. As a result, providing the idler pulley 800 as part of the tensioner 100 may in some embodiments result in a net reduction in the parasitic losses that are associated with the accessory drive system.

Another effect of the idler pulley may be to change the responsiveness of the tensioner 100 when exposed to a change in belt tension. In general, it has been observed that the tensioner 100 with the idler pulley 800 mounted about the axis 105 quickens the response of the tensioner 100 to adjust itself when exposed to a change in belt tension as compared to an example of the belt tensioner 100 without the idler pulley 800. This may be because any change in belt tension that occurs which drives the pivoting of the first tensioner arm 102 also generates a moment in the first tensioner arm 102 through the idler pulley 800, which is additive with the moment exerted on the first tensioner arm 102 from the belt 54 acting on the first pulley 106. If a fast response time or a large response to changes in belt tension are desired for a particular application, it may be desirable to add an idler puller 800 about the pivot axis 105. The idler pulley 800, when positioned in a way that quickens the response of the tensioner 100, may be referred to as an activator pulley.

Instead of positioning the added idler pulley 800 about the second pivot axis 105, the idler pulley 800 may alternatively be positioned about an idler pulley pivot axis 802 that is on the opposite side of the first pivot axis 104 to the first tensioner arm pulley rotation axis 107. In the position shown in FIG. 19, the idler pulley 800 can increase the amount of belt wrap that is provided about the crankshaft pulley 51, albeit by less than when the idler pulley 800 is mounted about the second pivot axis 105. The increased belt wrap may however still result in a sufficient reduction in belt tension that there could be a net energy savings associated with the idler pulley 800 as positioned in FIG. 19. It has been observed that, when the idler pulley 800 is positioned about an idler pulley pivot axis 802 that is on the opposite side of the first pivot axis 104 to the first tensioner arm pulley axis 106, the responsiveness of the tensioner 100 when exposed to a change in the belt tension is reduced as compared to an example of the tensioner 100 without the additional idler pulley 800. This is because any change in belt tension that occurs which drives the pivoting of the first tensioner arm 102 also generates a moment in the first tensioner arm 102 through the idler pulley 800, which is counter to the moment exerted on the first tensioner arm 102 from the belt 54 acting on the first pulley 106.

Figure 20:
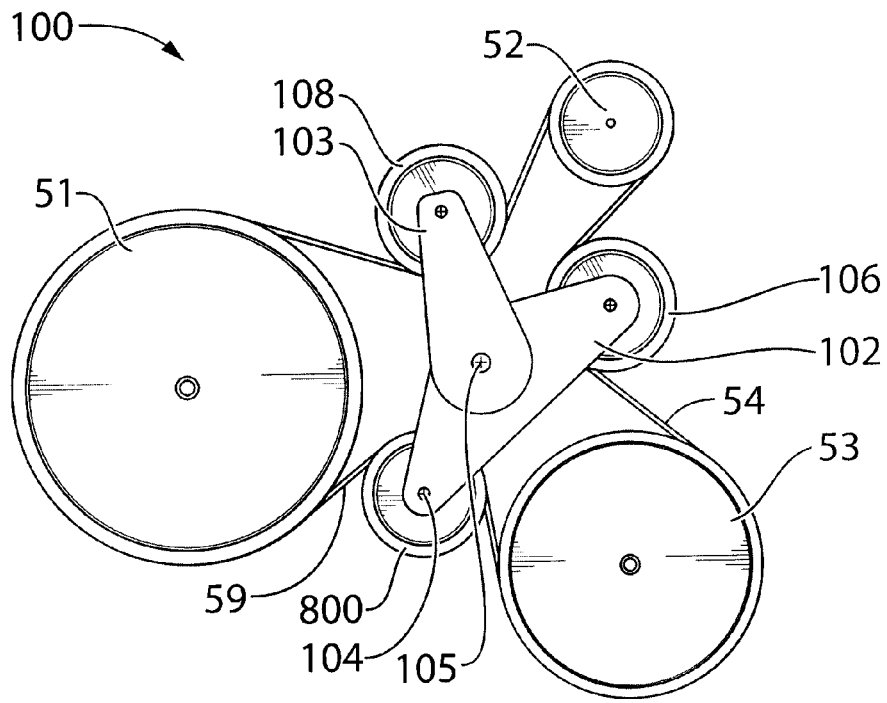
Figure 21:
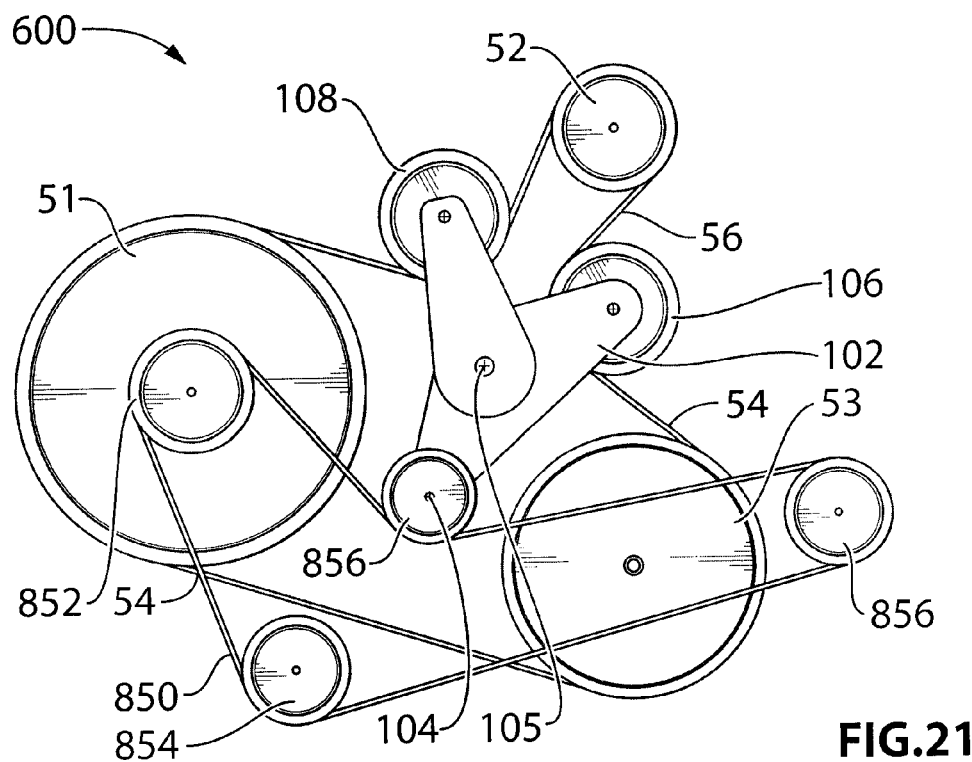
FIG. 21 is a plan view of another idler pulley that can be provided with the tensioner shown in FIG. 8, for engagement with a second endless drive member.

In some embodiments there may be vibrational forces imparted to the tensioner 100 resulting from engagement between pulley 106 on one side of the alternator or SGU pulley 52 and pulley 108 on the other side of the alternator or SGU pulley 52. Providing the idler pulley 800 as shown in FIG. 20, whereby it is positioned on the opposite side of the first pivot axis 104 to the pulley 106 can assist the tensioner 100 in resisting movement from the vibrational forces. The idler pulley 800 in a position where it reduces the responsiveness of the tensioner 100 may be referred to as a stabilizer pulley.

As another alternative, the pulley 800 could be positioned about the first pivot axis 104, as shown in FIG. 20. In the position shown in FIG. 20, the idler pulley 800 can increase the amount of belt wrap that is provided about the crankshaft pulley 51, albeit by less than when the idler pulley 800 is mounted about the second pivot axis 105. The increased belt wrap may however still result in a sufficient reduction in belt tension that there could be a net energy savings associated with the idler pulley 800 as positioned in FIG. 20. It has been observed that, when the idler pulley 800 is positioned about the first pivot axis 104, there is no change in the responsiveness of the tensioner 100 when exposed to a change in the belt tension, as compared to an example of the tensioner 100 without the idler pulley 800. This is because any forces that are incurred by the pulley 800 pass through the first pivot axis 104 and thus exert no moment on the first tensioner arm 102.

In general, providing an idler pulley 800 that increases belt wrap about the crankshaft pulley 51 is advantageous, particularly in applications where there is an increased risk of belt slip at the crankshaft pulley 51. For example, in applications wherein the SGU 16 is used as part of a BAS (belt-alternator-start) drive system and thus is used to turn the crankshaft pulley 51 and start the engine via the belt 54, there is an increased risk of belt slip at the crankshaft pulley 51 during such engine start events. By providing the idler pulley 800 the increased belt wrap about the crankshaft pulley 51 inhibits belt slip from occurring during such engine start events, without having to resort to very high belt tensions in the belt 54. Thus, the tensioner 100 and in particular, the tensioner 100 with one or more idler pulleys 800 can permit a vehicle to have a BAS drive system without having very high belt tensions. BAS drive systems can be helpful in some vehicles by providing stop-start capability so that the vehicle can be shut off when it is temporarily stationary (e.g. at a stoplight) and restarted when needed. While this can result in a savings in energy consumption, some BAS drive systems require the accessory drive system to operate at such elevated belt tensions that at least some of the energy consumption savings provided by the stop-start capability are negated by the increase in parasitic losses associated with the increased belt tension. By providing the tensioner 100 and in particular the tensioner 100 with the idler pulley 800, the belt wrap about the crankshaft pulley 51 can be tailored so that a low belt tension can be provided while still controlling the risk of belt slip in situations where the SGU is being used to start the engine via the belt 54. As a result, more of the energy savings associated with the BAS drive system can be realized.

While the idler pulley 800 is shown in a position wherein it increases the belt wrap about the crankshaft pulley 51 (and the accessory pulley 53), the idler pulley 800 may be provided to increase the belt wrap about some other accessory (in an accessory drive system that contains more accessories than are shown in the figures herein).

While only a single additional idler pulley 800 is shown, it is alternatively possible to provide further additional idler pulleys, in addition to the idler pulley 800 and the pulleys 106 and 108. Such additional pulleys can be used to increase belt wrap about an accessory pulley or for some other reason.

Providing an idler pulley such as pulley 800 may be advantageous for another reason, aside than increasing belt wrap about a pulley so as to prevent belt slip. For example, it can be seen from a comparison of FIGS. 15 and 18 that the idler pulley 800 changes the direction of the hub loads (i.e. the hub load vectors) at pulleys 51 and 53, and may affect the hub loads at other pulleys also. The hub load at pulley 51 is shown as a vector F51, and the hub load at pulley 53 is shown as a vector F53. These hub loads are examples of hub loads during a situation where the crankshaft pulley 51 is driving the belt 54.

Another advantage to providing the idler pulley 800 is that the hub loads on the idler pulley 800 can at least partially cancel the hub loads on the pulleys 106 and 108, so that the net hub load at the first pivot axis 104 may be lower than it would be in an example of the tensioner 100 without the idler pulley

800. Thus, the idler pulley 800 can be used to reduce the hub load at the pivot axis 104 of the first tensioner arm 102.

Idler Pulley for Use with Second Belt

The pulleys 800, 106, 108, 51, 52 and 53 have all been described as being used to engage the belt 54. In an embodiment in FIG. 21, the accessory drive system may further include a second belt 850 that moves in a second belt plane, which is a different belt plane than the first belt plane in which the belt 54 moves. The second belt 850 is driven by a second crankshaft pulley 852 that is mounted for co-rotation with the first crankshaft pulley 51. One or more accessory pulleys are driven by the second belt 850. In the example shown, two accessory pulleys 854 and 856 are shown. The accessory pulleys 854 may be pulleys from any suitable accessories, such as, for example, a vacuum pump, a compressor a power take-off, or any other suitable accessories.

In an embodiment, it may be possible to provide an idler pulley 856 on the first tensioner arm 102 that is positioned to engage the belt 850 in the second belt plane. The pulley 856 may be provided so as to provide a selected amount of belt wrap on the pulleys 854 and 852, or for the purpose of breaking up a large belt span that would otherwise exist and which could represent a risk for belt flutter to occur.

The idler pulley 856 may be positioned at the first pivot axis 104 of the tensioner 100 so that it will remain in a constant position even as changes in belt tension in the belt 54 cause pivoting movement of the first and second tensioner arms 102 and 103.

Additional Concepts

While it has been shown for the tensioners 1 and 100 to include first and second tensioner arms 2, 102 and 3, 103, further additional tensioner arms may be added. In other words, the tensioner 1 or 100 may include three tensioner arms, whereby, for example, there is a first tensioner arm with a pulley similar to arm 2 or 102 that is pivotally mounted to an engine block, a second arm with a pulley similar to arm 3 or 103 that is pivotally mounted to the first arm, and a third arm with a third pulley thereon that is also pivotally mounted to the first arm (or alternatively to the second arm). The third arm could be positioned anywhere suitable, such as, for example, at a position to engage a belt segment between the crankshaft pulley 51 and the pulley 53 instead of using idler pulley 800.

It has been shown for the tensioner arm 103 to have a 'pulley-under' configuration whereby the pulley 108 is positioned between the arm 102 and the engine block 99, whereas the tensioner arm 102 has been shown to have a 'pulley-over' configuration whereby the tensioner arm 102 is between the pulley 106 and the engine block 99. It will be understood that the tensioner 1 or 100 may have any suitable combination of pulley-over and pulley-under tensioner arms and that they configurations shown and describe are not intended to be limiting.

Brief Description of an Example Advantage of Y-Tensioner Concept Vs. V-Tensioner While advantages of the tensioners 1 and 100 may be clear from the description and figures above, for greater clarity, an advantage to them is summarized as follows: An advantage of the tensioners 1 and 100 shown and described herein offer several advantages over V-tensioners (i.e. tensioners that have a single pivot axis about which both the first and second tensioner arms pivot relative to the engine block). When using the tensioner 1 or 100 to tension a belt 54, the second tensioner arm 3 or 103 can be configured so that the belt segment 55 or 56 against which its pulley 108 is engaged can be kept tensioned with relatively little spring force needed from the tensioner spring (e.g. spring 126), because the second arm 3 or 103 can be configured to have a relatively small angle relative to the hub load that exists at pulley 108 from the belt 54. By contrast, when the pivot point of the first and second tensioner arms is the same (as is the case with a V tensioner), there is less flexibility in selecting the pivot point for the second tensioner arm and so it may be at a large included angle relative to the hub load exerted on its pulley. As a result, a relatively high spring force may be needed to generate the belt tension from the second tensioner arm in a V tensioner. A high spring force can necessitate an increase the size, weight and cost of a V tensioner relative to the tensioner 1 or 100.

Those skilled in the art will appreciate that a variety of modifications may be made to the embodiments described herein without departing from the fair meaning of the accompanying claims.

The invention claimed is:

1. A tensioner, comprising:
a first tensioner arm and a second tensioner arm, wherein the first tensioner arm is pivotable about a first pivot axis, and the second tensioner arm is pivotally connected to the first tensioner arm so as to be pivotable about a second pivot axis located at a selected distance from the first pivot axis;
a first wheel rotationally connected to the first tensioner arm about a first rotation axis, and a second wheel rotationally connected to the second tensioner arm about a second rotation axis, wherein the first and second wheels are configured to engage an endless drive member, wherein the first and second wheels are biased in respective first and second free arm directions; and
a spring positioned to bias the second tensioner arm towards a second segment of the endless drive member, wherein at least one of the first and second tensioner arms includes a hub portion that at least partially defines a spring chamber, wherein the spring is positioned in the spring chamber, and
wherein the selected distance between the first and second pivot axes is less than a radius of the hub portion.

2. A tensioner as claimed in claim 1, wherein the spring is a helical coil spring and wherein the selected distance between the first and second pivot axes is less than a radius of the coil spring.

3. A tensioner as claimed in claim 1, wherein the spring is a second arm biasing member and wherein the tensioner further comprises a first arm biasing member positioned to bias the first tensioner arm in the first free arm direction.

4. A tensioner as claimed in claim 1, further comprising a damping structure configured to apply a resistive force to the movement of one of the tensioner arms.

5. A tensioner as claimed in claim 4, wherein the damping structure varies the resistive force that is applied to said one of the tensioner arms based on the position of said one of the tensioner arms.

6. A tensioner as claimed in claim 4, wherein the damping structure varies the resistive force that is applied to said one of the tensioner arms based on the rotational speed of said one of the tensioner arms.

7. A tensioner as claimed in claim 4, wherein the damping structure varies the resistive force that is applied to said one of the tensioner arms based on the direction of travel of said one of the tensioner arms.

8. A tensioner as claimed in claim 4, wherein the damping structure is configured to apply a resistive force that is applied to said one of the tensioner arms based on the rotational speed of said one of the tensioner arms.

9. A tensioner as claimed in claim 4, wherein the damping structure includes a first friction member, a second friction member and a damping structure biasing structure that urges the first and second friction members into engagement with each other.

10. A tensioner as claimed in claim 1, further comprising an idler wheel that is rotatably connected to one of the first and second tensioner arms, and that is positioned to engage the endless drive member.

11. A tensioner as claimed in claim 10, wherein the idler wheel is rotatably connected to the first tensioner arm for rotation about the first pivot axis.

12. An endless drive arrangement for an internal combustion engine, comprising:
   an accessory having a rotor that is connected to an accessory wheel;
   an endless drive member that wraps partially around the accessory wheel and partially around a crankshaft wheel on a crankshaft of the internal combustion engine; and
   a tensioner including
      a first tensioner arm and a second tensioner arm, wherein the first tensioner arm is pivotable about a first pivot axis, and the second tensioner arm is pivotally connected to the first tensioner arm so as to be pivotable about a second pivot axis located at a selected distance from the first pivot axis;
      a first wheel rotationally connected to the first tensioner arm about a first rotation axis, the first wheel resting against a first segment of the endless drive member so as to tension the endless drive member;
      a second wheel rotationally connected to the second tensioner arm about a second rotation axis, the second wheel resting against a second segment of the endless drive member so as to tension the endless drive member, wherein the first and second wheels are both biased towards engagement with the respective first and second segments of the endless drive member; and
   a coil torsion spring positioned to bias the second tensioner arm towards the second segment of the endless drive member,
   wherein at least one of the first and second tensioner arms includes a hub portion that at least partially defines a spring chamber, wherein the coil torsion spring is positioned in the spring chamber, and
   wherein the selected distance between the first and second pivot axes is less than a radius of the hub portion.

13. An endless drive as claimed in claim 12, wherein the accessory is a starter-generator unit and wherein the first and second segments of the endless drive member each have an end at the starter-generator unit wheel.

14. An endless drive as claimed in claim 13, wherein the second segment of the endless drive member is under higher tension than the first segment of the endless drive member when the crankshaft wheel drives the endless drive member, and the first segment of the endless drive member is under higher tension than the second segment of the endless drive member when the starter-generator unit drives the endless drive member.

15. An endless drive as claimed in claim 12, wherein the first wheel is spaced ahead of the second wheel in the clockwise direction about the first pivot axis when facing the endless drive on the internal combustion engine.

16. An endless drive as claimed in claim 12, wherein the first wheel is spaced ahead of the second wheel in the counterclockwise direction about the first pivot axis when facing the endless drive on the internal combustion engine.

17. An endless drive as claimed in claim 12, further comprising an idler wheel that is rotatably connected to one of the first and second tensioner arms, and that engages a third segment of the endless drive member.

18. An endless drive as claimed in claim 17, wherein the idler wheel is rotatably connected to the first tensioner arm for rotation about the first pivot axis.

19. An endless drive as claimed in claim 17, wherein the idler wheel is rotatably connected to the first tensioner arm about an idler wheel rotation axis, wherein the first pivot axis is positioned substantially between the idler wheel rotation axis and the second pivot axis.

20. An endless drive as claimed in claim 17, wherein the idler wheel is rotatably connected to the first tensioner arm about an idler wheel rotation axis, wherein both the second pivot axis and the idler wheel rotation axis are positioned on the same side of the first pivot axis.

* * * * *